(12) United States Patent
Takeda et al.

(10) Patent No.: US 8,388,703 B2
(45) Date of Patent: *Mar. 5, 2013

(54) METHOD FOR PRODUCING POSITIVE ELECTRODE FOR NON-AQUEOUS ELECTROLYTE SECONDARY CELL AND METHOD FOR PRODUCING NON-AQUEOUS ELECTROLYTE SECONDARY CELL

(75) Inventors: Katsutoshi Takeda, Moriguchi (JP); Yoshio Kato, Moriguchi (JP); Shingo Tode, Moriguchi (JP); Masanori Maekawa, Moriguchi (JP); Shigeki Matsuta, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,747

(22) Filed: May 11, 2012

(65) Prior Publication Data

US 2012/0280172 A1    Nov. 8, 2012

Related U.S. Application Data

(62) Division of application No. 12/268,706, filed on Nov. 11, 2008, now Pat. No. 8,197,556.

(30) Foreign Application Priority Data

Nov. 13, 2007 (JP) ................................. 2007-294829
Oct. 10, 2008 (JP) ................................. 2008-264406

(51) Int. Cl.
*H01M 4/525* (2010.01)

(52) U.S. Cl. ... 29/623.1; 29/623.5; 429/122; 429/218.1; 502/101; 252/182.1

(58) Field of Classification Search .................. 429/122, 429/218.1; 29/623.1, 623.5; 502/101; 252/182.1
See application file for complete search history.

(56) References Cited

PUBLICATIONS

"Abstract of Speeches at the 47th Battery Symposium", pp. 326-327, Nov. 20-22, 2006 (partial translation).

*Primary Examiner* — Ula C Ruddock
*Assistant Examiner* — Amanda Barrow
(74) *Attorney, Agent, or Firm* — Westerman, Hattori, Daniels & Adrian, LLP

(57) ABSTRACT

A method for producing a non-aqueous electrolyte secondary cell by preparing a positive electrode by applying a positive electrode mixture onto a positive electrode core material, the mixture containing a positive electrode active material mainly made of a lithium nickel composite oxide and a binding agent containing polyvinylidene fluoride; measuring the amount of carbon dioxide gas generated when a layer of the positive electrode mixture is removed out of the positive electrode and the layer is heated to 200° C. or higher and 400° C. or lower in an inactive gas atmosphere; selecting a positive electrode satisfying the following formulas:

$$y<(0.27x-51)/1000000 (200 \leq x<400) \quad \text{formula 1}$$

$$y<57/1000000 (400 \leq x \leq 1500) \quad \text{formula 2}$$

where x is a heating temperature (° C.) and y is the amount of carbon dioxide gas (mole/g) per 1 g of the lithium nickel composite oxide measured; and preparing the non-aqueous electrolyte secondary cell by using the positive electrode selected.

5 Claims, 12 Drawing Sheets

US 8,388,703 B2

METHOD FOR PRODUCING POSITIVE ELECTRODE FOR NON-AQUEOUS ELECTROLYTE SECONDARY CELL AND METHOD FOR PRODUCING NON-AQUEOUS ELECTROLYTE SECONDARY CELL

CROSS-REFERENCE TO RELATED APPLICATIONS

This application is a divisional of application Ser. No. 12/286,706, filed Nov. 11, 2008, which is herein incorporated by reference.

BACKGROUND OF THE INVENTION

1) Field of the Invention

The present invention relates to an improvement of a method for producing a non-aqueous electrolyte secondary cell, and more particularly to a method for producing a non-aqueous electrolyte secondary cell using lithium nickel composite oxide as a positive electrode active material.

2) Description of the Related Art

Non-aqueous electrolyte secondary cells, for their high energy density and high capacity, are widely used as power sources for mobile appliances. Conventionally, as the positive electrode active material used for the non-aqueous electrolyte secondary cells, lithium cobalt composite oxide ($LiCoO_2$), which excels in discharge property, has been used.

However, an increasing need for further enhancement of cell capacity and an increase in cell cost due to rising prices of cobalt have drawn attention to lithium nickel composite oxide $Li_aNi_xM_{1-x}O_2$ (where M is at least one selected from Co, Al, Zr, Ti, Mg, and Mn, $0.9 \leq a-1.1$, and $0.5 \leq x \leq 1$) as the positive electrode active material of non-aqueous electrolyte secondary cells.

However, the lithium nickel composite oxide still possess problems to be solved, among which are the problem of a decrease in cell capacity and the problem of cell swelling. For example, non-patent document 1 ("Abstracts of Speeches at the 47th Battery Symposium," pp. 326-327) reports that if a lithium nickel composite oxide exposed to atmosphere is used to constitute a non-aqueous electrolyte secondary cell, cell swelling occurs from high-temperature preservation.

Non-patent document 1 gives a possible cause for such cell swelling as follows. If the lithium nickel composite oxide is exposed to atmosphere, the lithium ions in the lithium nickel composite oxide react with moisture in atmosphere whereby a highly reactive lithium hydroxide is generated, which in turn reacts with carbon dioxide in atmosphere to result in lithium carbonate ($Li_2CO_3$). Also, the moisture contained in the atmosphere-exposed lithium nickel composite oxide decomposes $LiPF_6$ serving as electrolytic salt inside the cell to generate hydrofluoric acid (HF). This in turn decomposes the lithium carbonate ($Li_2CO_3$), thereby generating carbon dioxide gas inside the cell. The gas generated inside the cell possibly remains between the positive and the negative electrodes to the detriment of the opposing condition thereof, resulting in a decrease in cell capacity.

The generation of lithium hydroxide possibly causes a decrease in cell capacity also in such a respect that the amount of lithium nickel composite oxide that contributes to charge/discharge decreases.

Incidentally, as a method for solving these problems associated with the positive electrode active material, carrying out the whole process of cell production under conditions without exposure to atmosphere, such as in a dry air atmosphere and an inactive gas atmosphere, are contemplated. However, this method causes a significant increase in production cost. Therefore, this method is not practical.

In view of these circumstances, such a method is conventionally employed that tests for cell swelling, a decrease in cell capacity, and the like are carried out after a cell is complete, and when the cell is judged to be unsuitable, all the cells of the same production lot are discarded. However, this method may significantly degrade the production yield, and the decreased production yield causes the problem of raising the price of the complete cell.

SUMMARY OF THE INVENTION

Thus, cell swelling, a decrease in cell capacity, and the like occur to the non-aqueous electrolyte secondary cell using lithium nickel composite oxide as the positive electrode active material. Eliminating in advance the causes for these problems significantly enhances the production yield. This necessitates a judgment method that easily predicts occurrence of the problems before the cell is complete, but such method is still not established.

It is an object of the present invention to, with respect to a non-aqueous electrolyte secondary cell using lithium nickel composite oxide, devise a quality judgment method for lithium nickel composite oxide such that a suitable lithium nickel composite oxide is easily selected, to devise a positive electrode judgment method that easily selects only a suitable positive electrode before assembly of the cell, and thereby to establish a production method that produces with a good yield a high quality non-aqueous electrolyte secondary cell without cell swelling and decrease in cell capacity.

(1) In order to accomplish the above-mentioned objects, a method for producing a positive electrode for a non-aqueous electrolyte secondary cell according to a first aspect of the present invention is configured as follows.

The method for producing a positive electrode for a non-aqueous electrolyte secondary cell includes the steps of: a baking step of baking a positive electrode active material precursor containing a lithium source and a nickel source in order to render the positive electrode active material precursor a lithium nickel composite oxide; a measuring step of measuring the amount of carbon dioxide gas generated when the lithium nickel composite oxide is heated to 200° C. or higher and 1500° C. or lower in an inactive gas atmosphere; a selecting step of selecting a lithium nickel composite oxide satisfying the following formulas:

$y<(0.27x-51)/1000000 (200 \leq x<400)$   formula 1

$y<57/1000000 (400 \leq x \leq 1500)$   formula 2 where x is a heating temperature (° C.) in the measuring step and y is the amount of carbon dioxide gas (mole/g) per 1 g of the lithium nickel composite oxide measured in the measuring step; and a positive electrode completing step of completing the positive electrode by using a positive electrode active material mainly made of the lithium nickel composite oxide selected in the selecting step.

When a lithium nickel composite oxide exposed to atmosphere is heated to 200° C. or higher and 1500° C. or lower in an inactive gas atmosphere, carbon dioxide gas is generated. The present inventors have found out a cause for this as follows. The lithium ions in the lithium nickel composite oxide react with moisture in atmosphere whereby lithium hydroxide is generated, which in turn reacts with carbon dioxide gas in atmosphere whereby a thermally decomposing carbonate compound, described later, is generated.

The series of reactions to generate the thermally decomposing carbonate compound are reactions to decrease the amount of the lithium nickel composite oxide contributive to charge/discharge, and therefore, occurrence of these reactions decreases the discharge capacity. Also, when a cell with a lithium nickel composite oxide that has experienced these reactions is preserved at a high temperature, particularly at 60° C. or higher, then the thermally decomposing carbonate compound is decomposed to generate carbon dioxide gas, thereby causing the cell to swell in a large degree. Hence, making the content of the thermally decomposing carbonate compound small is essential in obtaining a cell of good quality, and whether the content of the thermally decomposing carbonate compound is large or small can be an indicator by which to judge the quality of the positive electrode active material.

That is, there is a correlation between cell performance and the amount of carbon dioxide gas (hereinafter referred to as carbon dioxide gas amount) that is generated when the lithium nickel composite oxide is heated to 200° C. or higher and 1500° C. or lower in an inactive gas atmosphere. Therefore, by sampling a part of a lithium nickel composite oxide of the same production lot (i.e., production under the same conditions), heating the sample at the above-mentioned temperature range, measuring the amount of the resulting carbon dioxide gas, and introducing the carbon dioxide gas amount in formulas 1 and 2, it can be determined whether the lithium nickel composite oxide of this lot is a suitable product. By using this lithium nickel composite oxide quality judgment method to select a lithium nickel composite oxide suitable for the positive electrode active material, a high quality positive electrode is prepared. This significantly improves the yield.

When the lithium nickel composite oxide is heated in an active gas atmosphere containing oxygen gas, a minute amount of organic substance that remains on the lithium nickel composite oxide and a test container combusts (reacts with oxygen) to generate carbon dioxide gas. This disables the amount of the carbon dioxide gas caused by the thermally decomposing carbonate compound to be measured accurately, thereby necessitating the lithium nickel composite oxide to be heated in an inactive gas atmosphere.

As the inactive gas, argon gas or nitrogen gas is preferably used, and more preferably, argon gas is used.

If the heating temperature is lower than 200° C., the generation amount of the carbon dioxide gas is too small, which makes it difficult to judge the quality of the lithium nickel composite oxide. In view of this, the heating temperature is 200° C. or higher. If the heating temperature exceeds 1500° C., lithium carbonate that is caused by the lithium source and that is not reactive in the baking step is thermally decomposed to generate carbon dioxide gas, which also makes it difficult to judge the quality of the lithium nickel composite oxide. In view of this, the heating temperature is 1500° C. or lower.

In order to further enhance the reliability of the judgment, the heating is preferably carried out to 400° C. or higher, at which the generation of carbon dioxide gas is almost complete. In view of heating costs, the upper limit of the heating temperature is preferably 800° C. More preferably, the heating temperature is 450±50° C.

As the method for measuring the carbon dioxide gas amount, gas chromatography is preferably used in that the gas generation amount can be analyzed easily, in a short time, and accurately. The carbon dioxide gas amount may be measured by thermal gravimetry analysis (TGA), which measures a change in mass before and after heating.

Also in the first aspect of the present invention, the measuring step may include: putting the lithium nickel composite oxide in a stainless used steel reaction tube filled with the inactive gas: heating the reaction tube to 200° C. or higher and 1500° C. or lower in order to generate carbon dioxide gas; and measuring the amount of the carbon dioxide gas by gas chromatography. This configuration is preferable in that substitution to the inactive atmosphere is facilitated, and the carbon dioxide gas that is generated from heating the lithium nickel composite oxide can be captured accurately.

Also in the first aspect of the present invention, the positive electrode active material may contain, in addition to a good quality lithium nickel composite oxide selected by the lithium nickel composite oxide quality judgment method, a known positive electrode active material other than the lithium nickel composite oxide, examples including lithium cobalt composite oxide and spinel lithium manganese composite oxide. It should be noted, however, that if the content of the good quality lithium nickel composite oxide is too small, the advantages (reduction in cost and increase in capacity) of using the lithium nickel composite oxide as the positive electrode active material cannot be sufficiently obtained. In view of this, the mass percentage of the good quality lithium nickel composite oxide in the total mass of the positive electrode active material is 50 to 100 mass %, more preferably 75 to 100 mass %.

(2) In order to accomplish the above-mentioned objects, a method for producing a non-aqueous electrolyte secondary cell according to a second aspect of the present invention is configured as follows.

The method for producing a non-aqueous electrolyte secondary cell includes the steps of; a positive electrode preparing step of applying a positive electrode mixture onto a positive electrode core material, whereby a positive electrode results, the mixture containing a positive electrode active material mainly made of a lithium nickel composite oxide and a binding agent containing polyvinylidene fluoride; a measuring step of measuring the carbon dioxide gas amount generated when a layer of the positive electrode mixture is removed out of the positive electrode and the layer is heated to 200° C. or higher and 400° C. or lower in an inactive gas atmosphere; a selecting step of selecting a positive electrode satisfying the following formulas:

$$y<(1.31x-258)/1000000 (200 \leq x<300) \qquad \text{formula 3}$$

$$y<1.20x-225/1000000 (300 \leq x \leq 400) \qquad \text{formula 4}$$

where x is a heating temperature (° C.) in the measuring step and y is the amount of carbon dioxide gas (mole/g) per 1 g of the positive electrode measured in the measuring step; and a cell preparing step of preparing the non-aqueous electrolyte secondary cell by using the positive electrode selected in the selecting step.

Even in the case of using the lithium nickel composite oxide selected according to the first aspect of the present invention, the lithium nickel composite oxide and impurities contained therein may react with moisture and carbon dioxide by, for example, contact with atmosphere in the series of steps for completing the positive electrode including: preparing a positive electrode mixture by mixing a binding agent and other additives in the lithium nickel composite oxide; and applying the mixture onto a positive electrode plate and rolling the plate. This necessitates a judgment method for evaluating the suitability of the complete positive electrode in addition to judging the quality of the lithium nickel composite oxide as the positive electrode active material before the positive electrode is complete. The second aspect of the present invention relates to a method for producing a non-aqueous electrolyte secondary cell that realizes a high quality complete cell by easily judging the quality of the positive electrode by a positive electrode quality judgment method that enables judgment as to whether the complete positive electrode is a suitable product, and by selecting and using a positive electrode judged as a good product.

A binding agent is necessary in applying the positive electrode active material onto the positive electrode core material, and as this binding agent, polyvinylidene fluoride is usually used. The present inventors removed a positive electrode mixture layer (active material layer) out of a lithium nickel composite oxide positive electrode using polyvinylidene fluoride as the binding agent, and heated the positive electrode mixture layer. It has been found that a larger amount of carbon dioxide gas is generated than when heating the lithium nickel composite oxide alone. The present inventors have further found that the large amount of carbon dioxide gas is not caused by moisture contained in the binding agent and solvent or by moisture contained in atmosphere, but by the existence of the polyvinylidene fluoride itself.

Specifically, polyvinylidene fluoride is decomposed by heating to generate hydrogen fluoride (HF). This hydrogen fluoride is generated as a side reaction product of synthesis of the thermally decomposing carbonate compound and the lithium nickel composite oxide, and reacts with lithium carbonate that remains in the lithium nickel composite oxide to generate carbon dioxide gas. It has been found that the carbon dioxide gas amount increases in this manner.

The present inventors have also found that when the positive electrode mixture layer containing polyvinylidene fluoride is heated at high temperature, the hydrogen fluoride derived from the polyvinylidene fluoride becomes more influential, which makes difficult the judgment of the quality of the positive electrode by whether the carbon dioxide gas amount is large or small.

On the basis of the above findings, the thermal decomposition temperature of the positive electrode mixture layer according to the second aspect of the present invention is specified as 200° C. or higher and 400° C. or lower. Heating within the range of 200° C. or higher and 400° C. or lower the generation amount of the carbon dioxide gas caused by hydrogen fluoride is small and the amount of the carbon dioxide gas derived from the thermally decomposing carbonate compound is sufficiently large. Also within this temperature range, there is a sufficient correlation observed between the amount of the carbon dioxide gas that is generated from heating and cell performance.

Therefore, by removing the positive electrode mixture layer (layer made of the positive electrode active material, binding agent, conductive agent added as necessary, and the like) out of a part of the positive electrode prepared under the same conditions or out of an extra portion that occurs during cutting for a necessary size, heating the positive electrode mixture layer at a temperature within the above temperature range, measuring the amount of the resulting carbon dioxide gas, and introducing the heating temperature and the carbon dioxide gas generation amount in formulas 3 and 4, judgment as to whether the prepared positive electrode is a suitable product can be determined. By selecting and using a positive electrode judged to be a good product by this method, a high quality non-aqueous electrolyte secondary cell may be produced with a good production yield.

The measurement of the carbon dioxide gas amount is preferably carried out by gas chromatography, similarly to the first aspect of the present invention.

The heating is carried out in an inactive gas atmosphere, and as the inactive gas, argon gas or nitrogen gas is preferably used, and more preferably, argon gas is used.

The heating temperature is preferably 300±50° C., more preferably 300±10° C. At a heating temperature of around 300° C., the generation amount of the carbon dioxide gas caused by hydrogen fluoride becomes relatively small to a negligible degree, thereby enhancing the reliability of the judgment.

Also in the second aspect of the present invention, the measuring step may include: putting the positive electrode mixture layer in a stainless used steel reaction tube filled with the inactive gas; heating the reaction tube to 200° C. or higher and 400° C. or lower in order to generate carbon dioxide gas; and measuring the amount of the carbon dioxide gas by gas chromatography. This configuration is preferable in that substitution to the inactive atmosphere is facilitated, and the carbon dioxide gas that is generated from heating the lithium nickel composite oxide can be captured accurately.

Also in the second aspect of the present invention, similarly to the first aspect, the positive electrode active material may contain, in addition to a good quality lithium nickel composite oxide selected by the lithium nickel composite oxide quality judgment method, a known positive electrode active material other than the lithium nickel composite oxide, examples including lithium cobalt composite oxide and spinel lithium manganese composite oxide. It should be noted, however, that if the content of the good quality lithium nickel composite oxide is too small, the advantageous effects (reduction in cost and increase in capacity) of using the lithium nickel composite oxide as the positive electrode active material cannot be sufficiently exhibited. In view of this, the mass percentage of the good quality lithium nickel composite oxide in the total mass of the positive electrode active material is 50 to 100 mass %, more preferably 75 to 100 mass %.

As has been described hereinbefore, in the present invention, judgment is carried out for a suitable lithium nickel composite oxide as the positive electrode active material, a positive electrode is prepared by selecting and using a suitable lithium nickel composite oxide, whether the positive electrode is suitable as a positive electrode for a non-aqueous electrolyte secondary cell is judged before assembly of the cell, and the non-aqueous electrolyte secondary cell is prepared by selecting and using a suitable positive electrode for the non-aqueous electrolyte secondary cell. Thus, according to the present invention, a positive electrode for a non-aqueous electrolyte secondary cell having desired performance and a non-aqueous electrolyte secondary cell having desired performance are produced with a good yield.

BRIEF DESCRIPTION OF THE DRAWING

The present invention as defined in the claims can be better understood with reference to the text and to the following drawings, as follows:

DETAILED DESCRIPTION OF THE INVENTION

Figure 1:
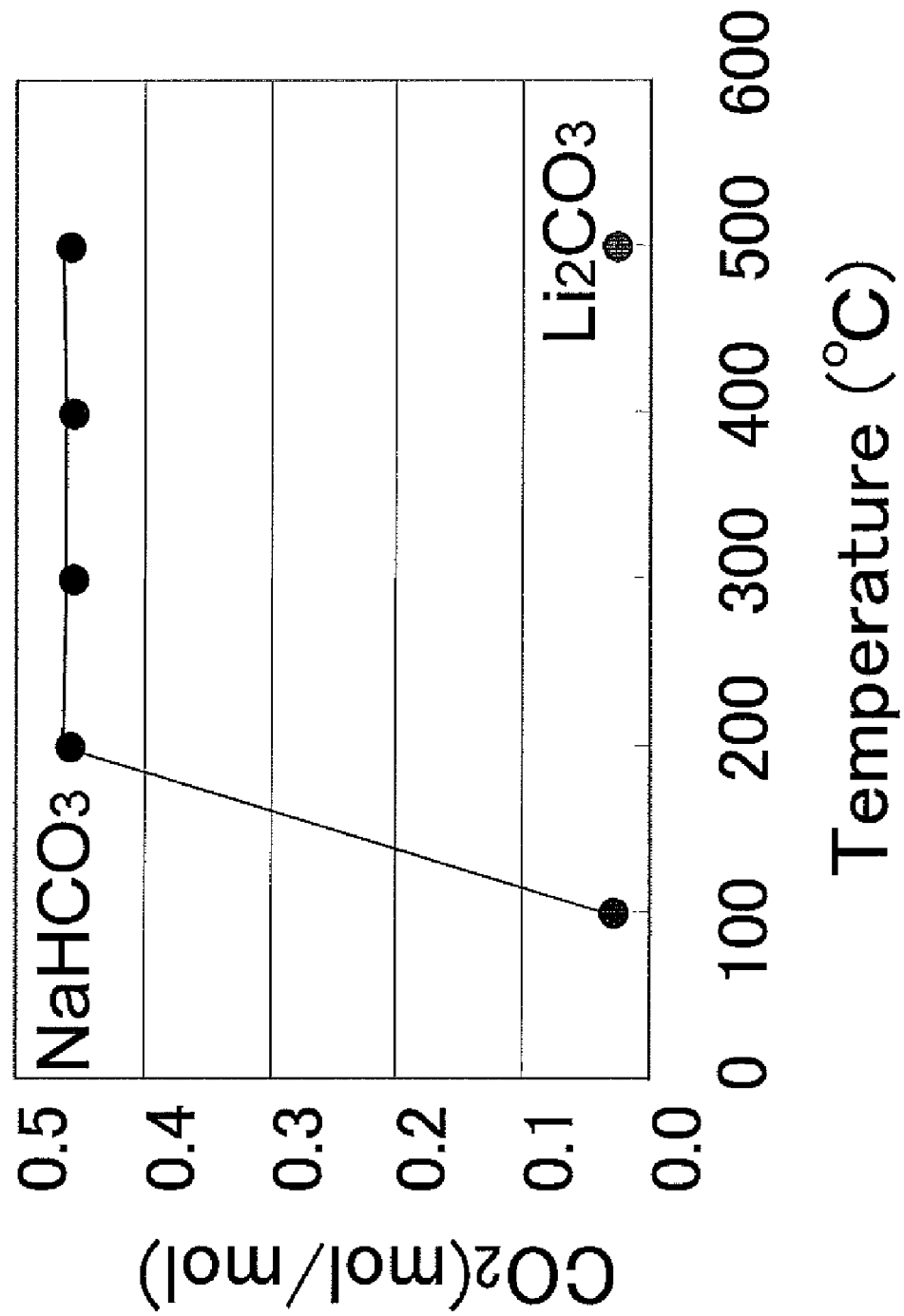
FIG. 1 is a graph showing the results of the thermal decomposition by gas chromatography of sodium hydrogen carbonate and lithium carbonate.

The preferred embodiments of the present invention will be proved by various experiments.

Experiment 1

Various experimental example cells were prepared and analyzed for their properties in order to reveal a relation between cell preparation conditions and cell performance.

Experimental Example 1

<Preparation of the Positive Electrode>

Nickel, cobalt, and aluminum were co-precipitated with sulfate to have nickel-cobalt-aluminum hydroxide. Lithium hydroxide was added to the nickel-cobalt-aluminum hydroxide, followed by baking at 700° C., thus obtaining lithium nickel composite oxide containing cobalt and aluminum ($LiNi_{0.8}Co_{0.15}Al_{0.05}O_2$).

The element content of the lithium nickel composite oxide was analyzed by ICP-AES (Inductively Coupled Plasma—Atomic Emission Spectrometry), and $LiNi_{0.8}Co_{0.15}Al_{0.05}O_2$ was confirmed.

Next, using a dry air atmosphere having a dew point of −40° C. or lower, 95 mass parts of the lithium nickel composite oxide, 2.5 mass parts of carbon powder as a conducting agent, 2.5 mass parts of polyvinylidene fluoride (PVDF) as a binding agent, and N-methyl-2-pyrrolidone (NMP) were mixed together, thus preparing a positive electrode active material slurry. This positive electrode active material slurry was applied to both surfaces of a positive electrode current collector made of aluminum in an atmosphere of 43% relative humidity and 25° C. temperature, and then dried. Then, the resulting product was rolled with a compressive roller in a dry air atmosphere having a dew point of −40° C. or lower, thus completing a positive electrode.

<Preparation of the Negative Electrode>

97.5 mass parts of natural graphite as the negative electrode active material, 1.5 mass parts of styrene-butadiene rubber (SBR), 1 mass part of carboxy methylcellulose (CMC) as a thickening agent, and pure water were mixed together, thus preparing a negative electrode active material slurry. This negative electrode active material slurry was applied to both surfaces of a negative electrode current collector made of copper, followed by drying. Then, the dried electrode plate was rolled with a compressive roller, thus completing a negative electrode.

<Preparation of the Electrode Assembly>

In the above atmosphere, the positive electrode and the negative electrode were wound with a separator made of a polypropylene porous film therebetween and then pressed, thus preparing a flat electrode assembly.

<Preparation of the Non-Aqueous Electrolyte>

Ethylene carbonate, methyl ethyl carbonate, and diethyl carbonate were mixed together at a volume ratio of 2:5:3 (25° C.), and then $LiPF_6$ as electrolytic salt was dissolved therein at a rate of 1.2M (mol/liter), thus obtaining a non-aqueous electrolyte.

<Assembly of the Cell>

A commercial aluminum laminate material was prepared. This aluminum laminate material was folded, and the side edges thereof were thermally fused, thus forming a bag-like outer casing having an electrode assembly storage space. Then, the above flat electrode assembly was inserted into the storage space, followed by 2.5 hours of vacuum drying at 105° C.

Next, in a dry box of argon atmosphere, the flat electrode assembly and the non-aqueous electrolyte were housed in the storage space. Then, the interior of the outer casing was depressurized to immerse the non-aqueous electrolyte inside the separator, and the opening portion of the outer casing was sealed, thus preparing a 62 mm high, 35 mm wide, 3.6 mm thick non-aqueous electrolyte secondary cell according experimental example 1 with a theoretical capacity of 800 mAh.

Experimental Example 2

A non-aqueous electrolyte secondary cell according to experimental example 2 was prepared in the same manner as in experimental example 1 except that after the positive electrode was complete, the positive electrode was left in a dry box having a dew point of −40° C. or lower under a 25° C. condition for 10 days (dry air exposure), and this was used as the positive electrode. In experimental example 1, this product was used to complete the positive electrode immediately after the lithium nickel composite oxide was prepared, and immediately thereafter, this complete positive electrode was used to complete the cell.

Experimental Example 3

A non-aqueous electrolyte secondary cell according to experimental example 3 was prepared in the same manner as in experimental example 1 except that after the positive electrode was complete, the positive electrode was left in a dry box having a dew point of −40° C. or lower under a 25° C. condition for 30 days, and this was used as the positive electrode.

Experimental Example 4

A non-aqueous electrolyte secondary cell according to experimental example 4 was prepared in the same manner as in experimental example 1 except that after the positive electrode was complete, the positive electrode was left in an atmosphere of 25° C. temperature and 43% relative humidity for 3 hours (atmosphere exposure), and this was used as the positive electrode.

Experimental Example 5

A non-aqueous electrolyte secondary cell according to experimental example 5 was prepared in the same manner as in experimental example 1 except that after the positive electrode was complete, the positive electrode was left in an atmosphere of the above conditions for a day (atmosphere exposure), and this was used as the positive electrode.

Experimental Example 6

A non-aqueous electrolyte secondary cell according to experimental example 6 was prepared in the same manner as in experimental example 1 except that after the positive electrode was complete, the positive electrode was left in an atmosphere of the above conditions for 3 days (atmosphere exposure), and this was used as the positive electrode.

Experimental Example 7

A non-aqueous electrolyte secondary cell according to experimental example 7 was prepared in the same manner as in experimental example 1 except that after the positive electrode was complete, the positive electrode was left in an atmosphere of the above conditions for 10 days (atmosphere exposure), and this was used as the positive electrode.

Experimental Example 8

A non-aqueous electrolyte secondary cell according to experimental example 8 was prepared in the same manner as in experimental example 1 except that after the positive electrode was complete, the positive electrode was left in an atmosphere of the above conditions for 10 days (atmosphere exposure), and then left in a dry box having a dew point of −40° C. or lower under a 25° C. condition for 10 days (dry air exposure), and this was used as the positive electrode.

<Cell Swelling Amount Measurement Test>

Two cells prepared under the conditions of each of the experimental examples were charged at a constant current of 1.0 It (800 mA) to a voltage of 4.2 V, then at a constant voltage of 4.2 V to a current of 0.05 It (40 mA), followed by measurement of cell thickness. Then, the charged cells were left in a thermostatic chamber of 85° C. for 3 hours, and cell thickness was measured immediately after the cells were picked out (thickness immediately after picking out). Then, the cells were left at 25° C. for 1 hour, and cell thickness after cooling was measured (thickness after cooling). The amount of cell swelling immediately after preservation and the amount of cell swelling after cooling were calculated. The results (average values) are shown in Table 1.

<Charge/Discharge Property Test>

Two cells prepared under the conditions of each of the experimental examples were charged at a constant current of 1.0 It (800 mA) to a voltage of 4.2 V, then at a constant voltage of 4.2 V to a current of 0.05 It (40 mA), followed by measurement of cell thickness. Then, the cells were discharged at a constant current of 1.0 It (800 mA) to a voltage of 2.5 V, followed by measurement of discharge capacity. Also an initial efficiency was calculated from the following formula. The results (average values) are shown in Table 1.

Initial efficiency(%)=discharge capacity/charge capacity×100

The charge capacity and the discharge capacity are represented by relative values with the results in experimental example 1 assumed to be 100.

<Discharge Load Property Test>

Two cells prepared under the conditions of each of the experimental examples were charged at a constant current of 1.0 It (800 mA) to a voltage of 4.2 V, then at a constant voltage of 4.2 V to a current of 0.05 It (40 mA), followed by measurement of cell thickness. Then, the cells were discharged at a constant current of 1.0 It (800 mA) to a voltage of 2.5 V, followed by measurement of discharge capacity (1.0 It discharge capacity). Then, the cells were charged again under the above conditions and discharged at a constant current of 0.2 It (160 mA) to a voltage of 2.5 V, followed by measurement of discharge capacity (0.2 It discharge capacity). Also a discharge load property was calculated from the following formula. The results (average values) are shown in Table 1.

Discharge load(%)=0.2 It discharge capacity/1.0 It discharge capacity×100

TABLE 1

| | Exposure conditions | Amount of cell swelling (mm) | | Charge capacity (%) | Discharge capacity (%) | Initial efficiency (%) | Discharge load property (%) |
| --- | --- | --- | --- | --- | --- | --- | --- |
| | | Immediately after picking out | After cooling | | | | |
| Experimental Example 1 | None | 0.73 | 0.26 | 100.0 | 100.0 | 88.8 | 106.7 |
| Experimental Example 2 | Dry air: 10 days | 0.92 | 0.36 | 99.6 | 100.1 | 89.1 | 106.6 |
| Experimental Example 3 | Dry air: 30 days | 1.17 | 0.43 | 100.2 | 99.7 | 88.5 | 107.0 |
| Experimental Example 4 | Atmosphere: 3 Hrs | 1.12 | 0.46 | 100.5 | 100.4 | 88.9 | 106.9 |
| Experimental Example 5 | Atmosphere: 1 day | 1.89 | 0.69 | 100.2 | 98.8 | 88.4 | 107.8 |
| Experimental Example 6 | Atmosphere: 3 days | 3.97 | 1.25 | 99.0 | 96.9 | 88.1 | 108.2 |
| Experimental Example 7 | Atmosphere: 10 days | 4.43 | 1.61 | 96.0 | 90.0 | 85.9 | 110.2 |

TABLE 1-continued

| | Exposure conditions | Amount of cell swelling (mm) | | Charge capacity (%) | Discharge capacity (%) | Initial efficiency (%) | Discharge load property (%) |
|---|---|---|---|---|---|---|---|
| | | Immediately after picking out | After cooling | | | | |
| Experimental Example 8 | Atmosphere: 10 days Dry air: 10 days | 4.89 | 1.67 | 95.9 | 89.2 | 85.5 | 110.5 |

Table 1 shows that experimental example 1, which experienced no exposure, was small in cell swelling amount compared with experimental examples 2 and 3, which experienced dry air exposure, experimental examples 4 to 7, which experienced atmosphere exposure, and experimental example 8, which experienced dry air exposure after atmosphere exposure. Table 1 also shows that the longer the dry air exposure time is, the larger the cell swelling amount tends to be (see experimental examples 2 and 3), and that the longer the atmosphere exposure time is, the larger the cell swelling amount tends to be (see experimental examples 4 to 7). Table 1 also shows that in the cases of the same exposure time, the cell swelling amount is larger in the cases of atmosphere exposure than in the cases of dry air exposure (see experimental examples 2, 3, 6, and 7).

Table 1 also shows that experimental examples 7 and 8 are significantly inferior to experimental example 1 in that the charge capacity is respectively 96.0% and 95.9% of that of experimental example 1, the discharge capacity is respectively 90.0% and 89.2% of that of experimental example 1, the initial efficiency is respectively 85.9% and 85.5% when that of experimental example 1 is 88.8%, and the discharge load property is respectively 110.2% and 110.5% when that of experimental example 1 is 106.7%.

These results are possibly due to adverse affects of moisture and carbon dioxide in atmosphere from exposure. When the complete positive electrode is exposed to atmosphere, moisture and carbon dioxide in atmosphere react with the lithium ions in the lithium nickel composite oxide, which is the positive electrode active material, resulting in the generation of a plurality of reaction products that cause cell swelling. From the result that swelling occurs also due to dry air exposure, this reaction possibly occurs, though slightly, in a dry air atmosphere having a dew point of −40° C. or lower.

Since the reaction products resulting from atmosphere exposure are not substances contributive to charge/discharge, the generation of the reaction products possibly reduces the amount of the active material, resulting in degradation of the charge capacity and the discharge capacity. Further, the generation of the reaction products possibly degrades the conductivity of the positive electrode, resulting in degradation of the discharge load property.

Experiment 2

The results shown in Table 1 reveal that the moisture incorporated in the positive electrode active material and the positive electrode is a cause of the degradation of cell performance. It is therefore possible to judge whether the quality of the positive electrode active material and the positive electrode is good or bad by measuring the amount of moisture contained in the positive electrode active material and the positive electrode. This will be studied in experiment 2.

<Measurement of the Amount of Moisture>

A lithium nickel composite oxide (positive electrode active material) was prepared in the same manner as in experimental example 1. This positive electrode active material was exposed under conditions shown in Table 2, and the amount of moisture contained in the exposed positive electrode active material was measured by the Karl Fischer method. Also a positive electrode was prepared in the same manner as in experimental example 1 and exposed under conditions shown in Table 2. Then, a positive electrode mixture layer (layer made of the positive electrode active material, binding agent, and conductive agent) was stripped off the positive electrode, and the amount of moisture contained in the positive electrode mixture layer was measured by the Karl Fischer method. The results are shown in Table 2.

TABLE 2

| | | Amount of moisture (ppm) | |
|---|---|---|---|
| No. | | Positive electrode active material a | Positive electrode mixture layer b |
| 1 | No exposure | 290 | 597 |
| 2 | Dry air: 10 days | 292 | 533 |
| 3 | Dry air: 30 days | 325 | 874 |
| 4 | Atmosphere: 3 hrs | 612 | — |
| 5 | Atmosphere: 1 day | 1329 | — |
| 6 | Atmosphere: 3 days | 2256 | 3552 |
| 7 | Atmosphere: 5 days | 2528 | — |
| 8 | Atmosphere: 10 days | 3708 | 4299 |
| 9 | Atmosphere: 10 days Dry air: 10 days | 3244 | 996 |

—: Not measured.

From Table 2, it has been found that for both the positive electrode active material and the positive electrode mixture layer, the longer the time for atmosphere exposure is, the larger the amount of moisture tends to be. Also it has been found that in the case of 10 days of dry air exposure after 10 days of atmosphere exposure for both the positive electrode active material and the positive electrode mixture layer, the amount of moisture was smaller than in the case of 10 days of atmosphere exposure alone. However, in Table 1, experimental example 8, which experienced 10 days of dry air exposure after 10 days of atmosphere exposure, is inferior in various cell properties to experimental example 7, which experienced 10 days of atmosphere exposure alone. Also it has been found that compared with experimental example 1, the cell swelling amount is large in experimental example 2, which experienced 10 days of dry air exposure, and experimental example 3, which experienced 30 days of dry air exposure.

These results show that it is impossible to judge the quality of the positive electrode active material and the positive electrode by the moisture content. The result for No. 9 shown in Table 2 is possibly because the dry air exposure removed part of the moisture adsorbed onto the positive electrode active material and the positive electrode during the atmosphere exposure.

Experiment 3

In experiment 3, a study was conducted on a method for judging the quality of the positive electrode active material and the positive electrode by using an indicator other than the moisture content.

<Concept>

If lithium hydroxide reacts with carbon dioxide gas in the atmosphere gas, a lithium carbonate compound is generated, and it is possible that this lithium carbonate compound is decomposed at high temperature preservation to generate carbon dioxide gas, thereby causing the amount of cell swelling to increase and the conductivity of the positive electrode to degrade. The present inventors focused on the lithium carbonate compound contained in the lithium nickel composite oxide and the lithium nickel composite oxide positive electrode, and speculated that the quality of the positive electrode active material and the positive electrode may be judged by measuring the amount of the carbon dioxide gas that is derived from the lithium carbonate compound and that is generated from heating the positive electrode active material.

Possible reaction products (lithium carbonate compounds) of the lithium hydroxide carbon dioxide gas include lithium carbonate ($Li_2CO_3$) and lithium hydrogen carbonate ($LiHCO_3$). In experiment 3, patterns of thermal decomposition of these compounds were analyzed. It should be noted that while the lithium carbonate was commercially available, the lithium hydrogen carbonate was not currently commercially available and difficult to obtain, and so instead of the lithium hydrogen carbonate, sodium hydrogen carbonate ($NaHCO_3$), which has a similar structure to that of the lithium hydrogen carbonate ($LiHCO_3$), was used. The commercial unavailability of the lithium hydrogen carbonate is presumably because the lithium hydrogen carbonate is an unstable substance.

The method for this experiment is as follows. Two argon gas-filled reaction tubes made of SUS (Stainless Used Steel) were prepared, and the lithium carbonate and the sodium hydrogen carbonate each were put into a different one of the tubes. Then the tubes were thermally treated in an electric furnace, followed by measurement of the amount of the resulting carbon dioxide gas by gas chromatography. The gas chromatography apparatus used was GC-14B, available from Shimadzu Corporation. This method will be hereinafter referred to as thermal decomposition-gas chromatography method.

The results of the thermal decomposition-gas chromatography method are shown in FIG. 1. FIG. 1 shows that by heating at 200° C. or higher, 1 mole of the sodium hydrogen carbonate generates approximately 0.45 mole of carbon dioxide gas.

The sodium hydrogen carbonate is possibly decomposed in the manner represented by the following reaction formula and generates carbon dioxide gas, and therefore, 0.5 mole of carbon dioxide gas is generated per 1 mole of the sodium hydrogen carbonate.

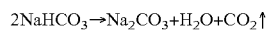

$$2NaHCO_3 \rightarrow Na_2CO_3 + H_2O + CO_2\uparrow$$

Thus, by heating at 200° C. or higher, 90% of the sodium hydrogen carbonate is decomposed.

FIG. 1 also shows that the lithium carbonate is hardly decomposed by heating at 100 to 500° C. These experimental results definitely show that the carbon dioxide gas that is generated from heating the atmosphere-exposed lithium nickel composite oxide at the condition of 500° C. or lower is derived from a substance other than the lithium carbonate. When almost no carbon dioxide gas is generated during heating under this temperature condition, the lithium carbonate compound contained in the lithium nickel composite oxide is assumed to be lithium carbonate. Validity of this assumption was further studied in experiment 4.

Experiment 4

A lithium nickel composite oxide was prepared in the same manner as in experimental example 1. This lithium nickel composite oxide was exposed for a predetermined period of time, and the exposed lithium nickel composite oxide was subjected to the thermal decomposition-gas chromatography method to measure the amount of the resulting carbon dioxide gas. The results are shown in FIGS. 2 and 3.

Figure 2:
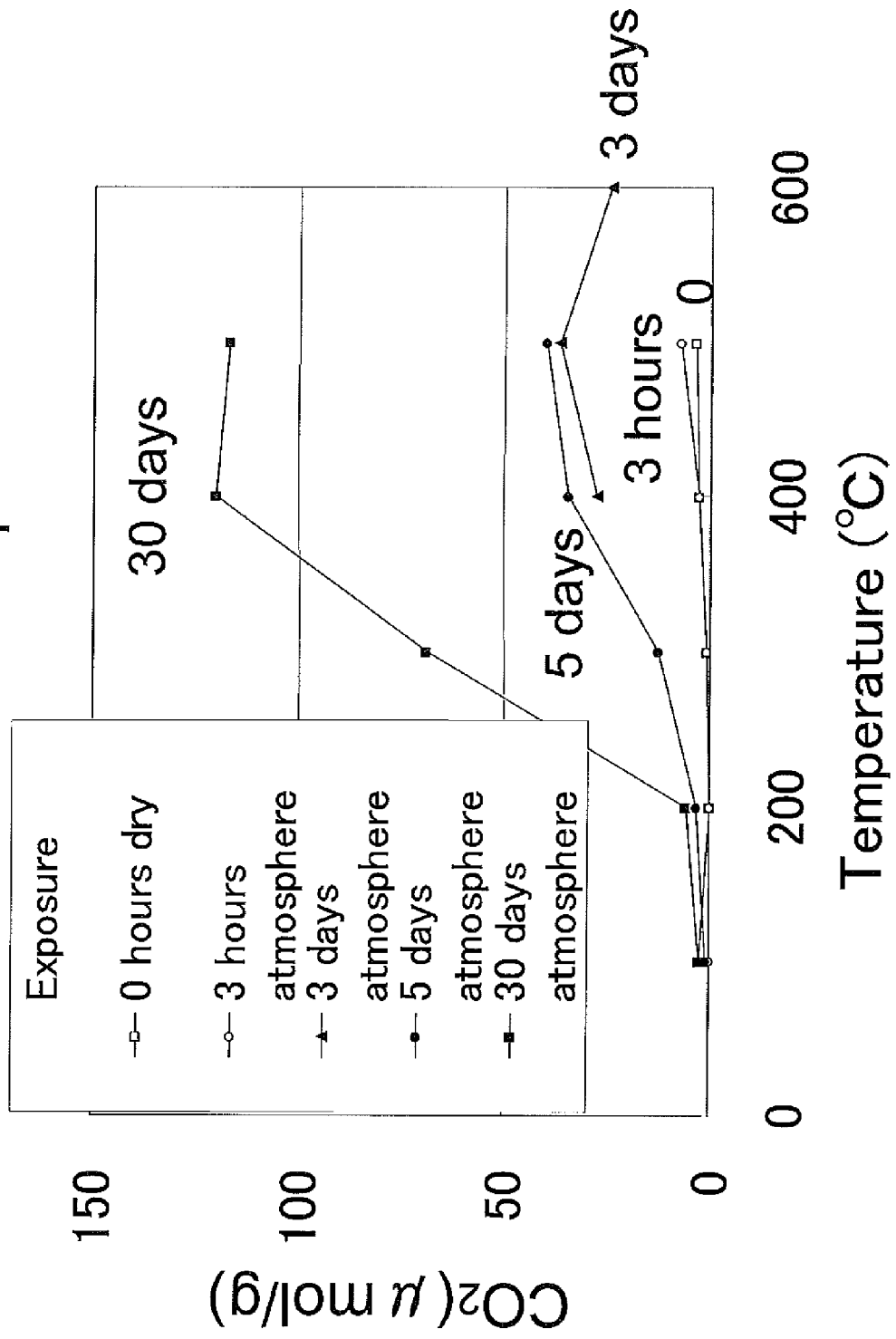
FIG. 2 is a graph showing the results of the thermal decomposition by gas chromatography of a positive electrode active material (lithium nickel composite oxide)

FIG. 2 shows the results corresponding to the conditions of 0 hours of dry air exposure (no exposure), 3 hours of atmosphere exposure, 3 days of atmosphere exposure, 5 days of atmosphere exposure, and 30 days of atmosphere exposure. FIG. 3 shows the result of 10 days of atmosphere exposure. FIGS. 2 and 3 show that heating the atmosphere-exposed lithium nickel composite oxide to 200° C. or higher generates carbon dioxide gas. FIGS. 2 and 3 also show that there is no significant difference in the generation amount of the carbon dioxide gas between 400° C. heating and 500° C. heating.

From these results, it can be said that the compound that is generated when the lithium nickel composite oxide is exposed to atmosphere is a compound that is thermally decomposed by heating at 200 to 500° C. to generate carbon dioxide gas. It is also seen that the generation amount of this compound substantially reaches its maximum at 400° C. This compound that generates carbon dioxide gas will be hereinafter referred to as "thermally decomposing carbonate compound."

Figure 3:
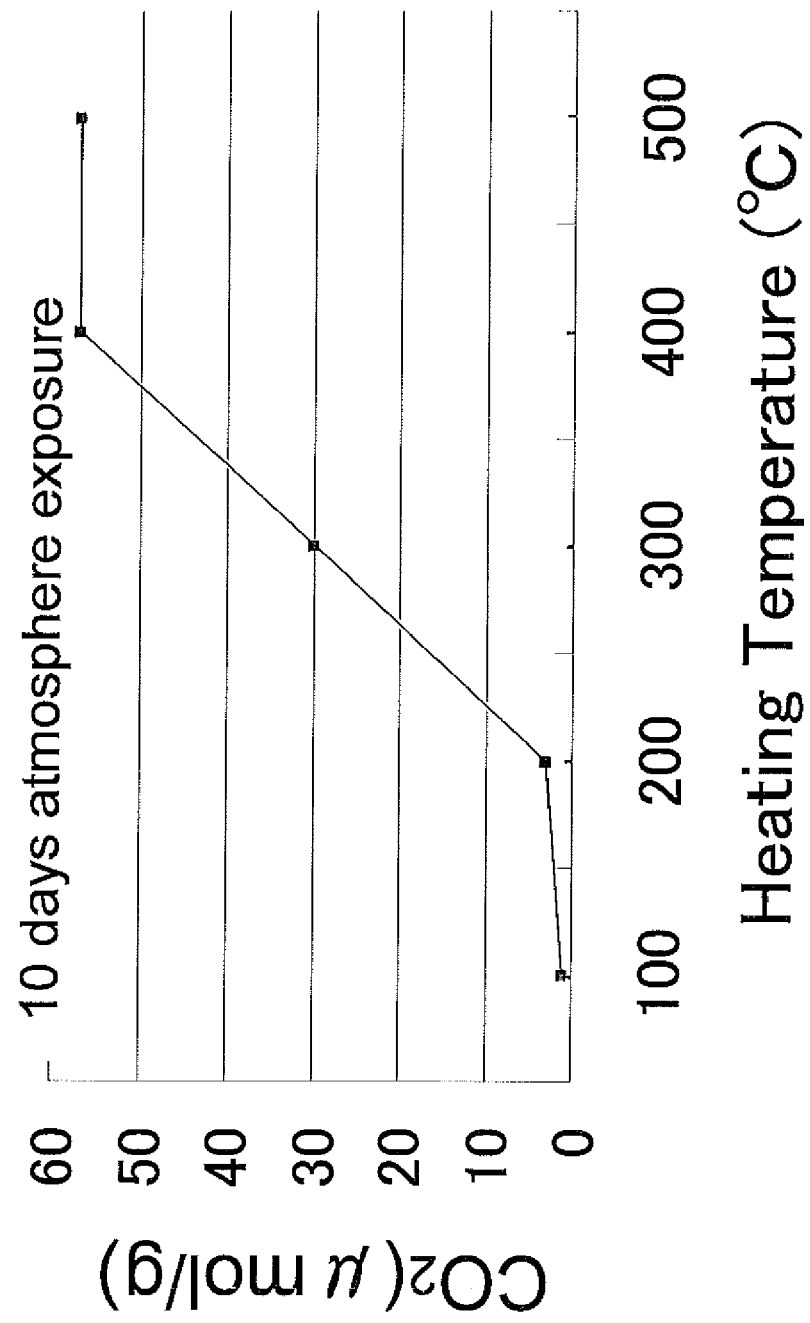
FIG. 3 is a graph showing the result of the thermal decomposition by gas chromatography of a positive electrode active material (lithium nickel composite oxide) exposed to atmosphere for 10 days.

FIGS. 2 and 3 also show that the longer the time for atmosphere exposure is, the larger the amount of the carbon dioxide gas that is generated from the 400° C. heating tends to be. This is possibly because as the exposure time becomes long, the amount of the resulting thermally decomposing carbonate compound increases.

This result leads to the conclusion that the compound that is generated when the lithium nickel composite oxide is exposed to atmosphere is not the lithium carbonate.

When the lithium nickel composite oxide is synthesized as the positive electrode active material, lithium hydroxide is used as a lithium source. When the lithium hydroxide comes in contact with atmosphere, it possibly reacts with carbon dioxide contained in atmosphere to generate lithium hydrogen carbonate. Since it is difficult to totally prevent contact with atmosphere in the whole production process of the lithium nickel composite oxide, the existence of the lithium hydrogen carbonate is possibly inevitable. The lithium hydrogen carbonate that is generated as a result of the reaction of the lithium hydroxide is decomposed by the heat from the baking step to be rendered lithium carbonate, and it is possible that this lithium carbonate remains in the lithium nickel composite oxide. In experiment 5, a study will be conducted on the relationship between the lithium hydrogen carbonate and carbon dioxide gas derived therefrom.

Experiment 5

When the lithium carbonate ($Li_2CO_3$) and the lithium hydrogen carbonate ($LiHCO_3$) react with hydrochloric acid, they generate carbon dioxide gas in the manners represented by formulas 1 and 2, respectively.

$$Li_2CO_3 + 2HCl \rightarrow 2LiCl + H_2O + CO_2 \uparrow \quad \text{Formula 1}$$

$$LiHCO_3 + HCl \rightarrow LiCl + H_2O + CO_2 \uparrow \quad \text{Formula 2}$$

When the lithium hydrogen carbonate is thermally decomposed, it generates carbon dioxide gas in the manner represented by formula 3.

$$2LiHCO_3 \rightarrow Li_2CO_3 + H_2O + CO_2 \uparrow \quad \text{Formula 3}$$

From formulas 1 to 3, when the thermally decomposing carbonate compound is assumed to be the lithium hydrogen carbonate, the amount (mole) of the carbon dioxide gas that is generated from the 500° C. heating is ½ the amount (mole) of the thermally decomposing carbonate compound. Also, the lithium hydrogen carbonate is decomposed by the baking heat (700° C.) from the synthesis of the lithium nickel composite oxide into lithium carbonate, water, and carbon dioxide. Hence, when the thermally decomposing carbonate compound is the lithium hydrogen carbonate, the lithium carbonate amount can be calculated from formula 4 with the amount of the carbon dioxide gas that is generated from the hydrochloric acid treatment and the amount (mole) of the carbon dioxide gas that is generated from the 500° C. heating.

{Lithium carbonate amount(number of moles)}={Amount of carbon dioxide gas generated from hydrochloric acid treatment(number of moles)}−{Amount of carbon dioxide gas generated from 500° C. heating(number of moles)}    Formula 4

The amount of the carbon dioxide gas that is generated during the 500° C. heating means the amount of the thermally decomposing carbonate compound. On the basis of the above hypothesis, experiment 5 was carried out in the following manner.

A lithium nickel composite oxide was prepared in the same manner as in experimental example 1. This lithium nickel composite oxide was exposed under various conditions and then allowed to react with hydrochloric acid, followed by measurement of the amount of carbon dioxide gas. With the assumption that the thermally decomposing carbonate compound was the lithium hydrogen carbonate, the amount of the thermally decomposing carbonate compound and the amount of the lithium carbonate were calculated from the above formula. The results are shown in FIG. 4.

Figure 4:
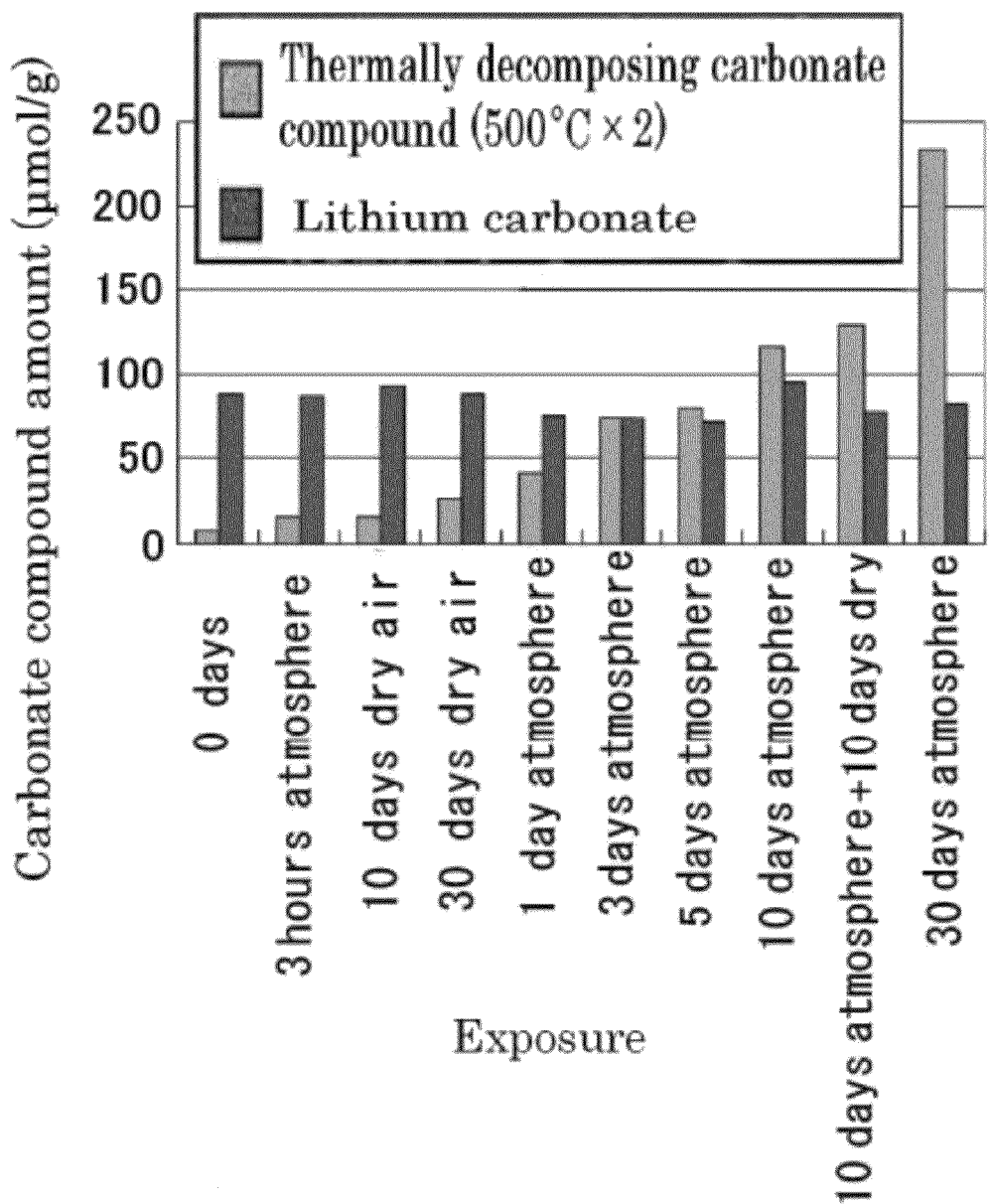
FIG. 4 is a graph showing the theoretical calculation value of the amount of a carbonate compound contained in the positive electrode active material.

FIG. 4 shows that the amount of the lithium carbonate is substantially constant regardless of the exposure conditions, while the amount of the lithium carbonate is small at 0 days of exposure but drastically increases as the degree of exposure increases.

The results of experiments 3 to 5 show that by measuring the amount of the carbon dioxide gas generated from heating to 200° C. or higher, the amount of the thermally decomposing carbonate compound contained in the lithium nickel composite oxide can be measured. Further, from FIGS. 2 and 3, which show that the generation amount of the carbon dioxide gas reaches its maximum at 400° C., it can be seen that heating to 400° C. or higher enables it to grasp the accurate generation amount of the carbon dioxide gas.

Experiment 6

In view of the above knowledge, a lithium nickel composite oxide prepared in the same manner as in experimental example 1 was heated at "500° C.," a temperature higher than 400° C., followed by measurement of the amount of the resulting carbon dioxide gas. At the same time, the swelling amount (after cooling) of a cell that used this lithium nickel composite oxide was examined. The result is shown in FIG. 5.

Figure 5:
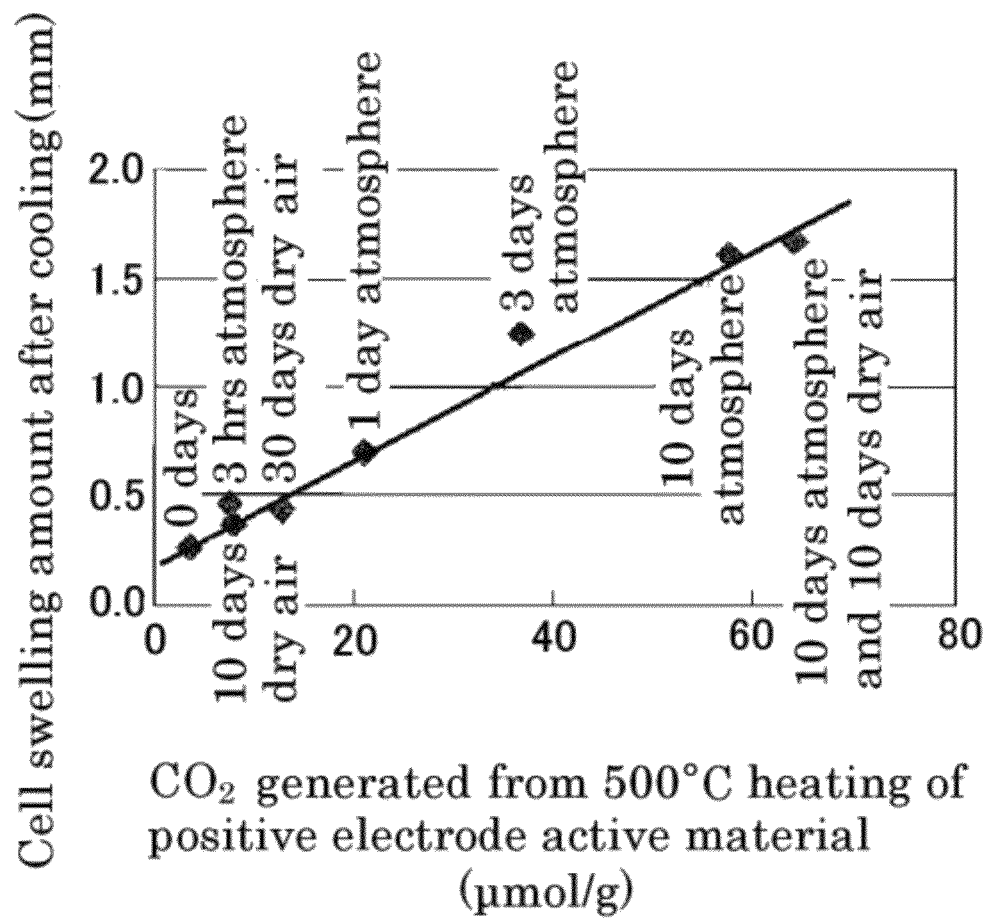
FIG. 5 is a graph showing a relation between the amount of cell swelling and the amount of carbon dioxide gas at 500° C.

FIG. 5 shows that there is a linear-functional relation between the generation amount of the carbon dioxide gas and the cell swelling amount. From this result, the thermally decomposing carbonate compound contained in the positive electrode active material is possibly decomposed during preservation at high temperature to generate carbon dioxide gas, which in turn increases the cell swelling amount. Judging comprehensively from this result and the results of experiment 5 (FIG. 4) and experiments 1 to 4 in light of the above hypothesis, it can be said that the lithium carbonate contained in the lithium nickel composite oxide is derived from the lithium hydrogen carbonate generated by the reaction between the lithium hydroxide serving as a lithium source and carbon dioxide gas contained in atmosphere. During synthesis by baking of the lithium nickel composite oxide, the lithium hydrogen carbonate is thermally decomposed into carbon dioxide gas, water, and lithium carbonate (see formula 3), and this lithium carbonate generated here remains in the lithium nickel composite oxide.

Thus, the main body of the thermally decomposing carbonate compound is possibly the lithium hydrogen carbonate, and therefore, by knowing the amount of the carbon dioxide gas generated from heating the lithium nickel composite oxide, it is possible to judge whether the lithium nickel composite oxide is degraded in quality as a result of exposure to atmosphere. That is, the generation amount of the carbon dioxide gas at the time of heating the lithium nickel composite oxide can serve as an indicator in judgment for a suitable positive electrode active material.

This conclusion has support in Table 3. Table 3 incorporates the generation amount (FIG. 4) of the carbon dioxide gas in the case of heating the lithium nickel composite oxide to 500° C.

TABLE 3

| | | Amount of cell swelling (mm) | | | | | | *Generation amount of |
| --- | --- | --- | --- | --- | --- | --- | --- | --- |
| | Exposure conditions | Immediately after picking out | After cooling | Charge capacity (%) | Discharge capacity (%) | Initial efficiency (%) | Discharge load property (%) | carbon dioxide gas (μ mole/g) |
| Experimental Example 1 | None | 0.73 | 0.26 | 100.0 | 100.0 | 88.8 | 106.7 | 3.6 |
| Experimental Example 2 | Dry air: 10 days | 0.92 | 0.36 | 99.6 | 100.1 | 89.1 | 106.6 | 7.9 |
| Experimental Example 3 | Dry air: 30 days | 1.17 | 0.43 | 100.2 | 99.7 | 88.5 | 107.0 | 13.0 |
| Experimental Example 4 | Atmosphere: 3 Hrs | 1.12 | 0.46 | 100.5 | 100.4 | 88.9 | 106.9 | 8.0 |

TABLE 3-continued

|  | Exposure conditions | Amount of cell swelling (mm) | | Charge capacity (%) | Discharge capacity (%) | Initial efficiency (%) | Discharge load property (%) | *Generation amount of carbon dioxide gas (μ mole/g) |
| --- | --- | --- | --- | --- | --- | --- | --- | --- |
|  |  | Immediately after picking out | After cooling |  |  |  |  |  |
| Experimental Example 5 | Atmosphere: 1 day | 1.89 | 0.69 | 100.2 | 98.8 | 88.4 | 107.8 | 21.0 |
| Experimental Example 6 | Atmosphere: 3 days | 3.97 | 1.25 | 99.0 | 96.9 | 88.1 | 108.2 | 37.0 |
| Experimental Example 7 | Atmosphere: 10 days | 4.43 | 1.61 | 96.0 | 90.0 | 85.9 | 110.2 | 57.0 |
| Experimental Example 8 | Atmosphere: 10 days Dry air: 10 days | 4.89 | 1.67 | 95.9 | 89.2 | 85.5 | 110.5 | 64.0 |

*The case of heating lithium nickel composite oxide to 500° C.

Table 3 shows that there is a good correlation between the generation amount of the carbon dioxide gas and whether the various properties of cell swelling amount, charge capacity, discharge property, and initial efficiency are good or bad. Table 3 also shows that experimental examples 7 and 8, which experienced exposure under the conditions of 10 days or more, are significantly inferior in the various properties of cell swelling amount, charge capacity, discharge property, and initial efficiency to experimental examples 1 to 6, which experienced exposure under the conditions of 3 days or less. Hence, the generation amount of the carbon dioxide gas can be used as a judgment criterion (indicator) for quality control. For example, when experimental examples 7 and 8 are assumed to be defective products, a lithium nickel composite oxide with a carbon dioxide gas amount of 57.0 or more is judged as an unsuitable product (defective product) as the positive electrode active material, while a lithium nickel composite oxide with a carbon dioxide gas amount of less than 57.0 is judged as a suitable product (good product).

The criteria for judging quality can be generalized in the manners represented by formulas 1 and 2 with the use of FIG. 3.

$$y<(0.27x-51)/1000000 (200 \leq x < 400) \quad \text{formula 1}$$

$$y<57/1000000 (400 \leq x \leq 1500) \quad \text{formula 2}$$

where x is the heating temperature (° C.) and y is the amount of carbon dioxide gas (mole/g) per 1 g of the lithium nickel composite oxide.

In the above formulas, raising the heating temperature beyond 1500° C. may decompose the lithium carbonate as well as the thermally decomposing carbonate compound. In view of this, the upper limit of the heating temperature is 1500° C. The lower limit of the heating temperature is 400° C. or higher, at which the generation amount of the carbon dioxide gas approximately reaches an equilibrium. A more preferable upper limit of the heating temperature is 500° C. considering heating costs.

<Judgment Method for the Quality of the Complete Positive Electrode>

The degradation of the quality of the lithium nickel composite oxide occurs not only in the course of synthesis of the lithium nickel composite oxide but also in the production process of the positive electrode and after completion thereof. Hence, the complete cell may not exhibit desired performance even though a suitable lithium nickel composite oxide is selected and used as the positive electrode active material.

This necessitates an easy judgment method for judging whether the complete positive electrode is good or bad, in addition to the judgment method for the quality of the lithium nickel composite oxide. In view of this, a study was conducted on the method for judging whether the complete positive electrode is good or bad.

Experiment 7

A positive electrode was prepared in the same manner as in experimental example 1 and exposed to atmosphere under predetermined conditions for a predetermined period of time. Then, a positive electrode mixture layer (active material layer made of the positive electrode active material, binding agent, and conductive agent) was stripped off the positive electrode, and this sample was subjected to the thermal decomposition-gas chromatography method. The results are shown in FIG. 6.

Figure 6:
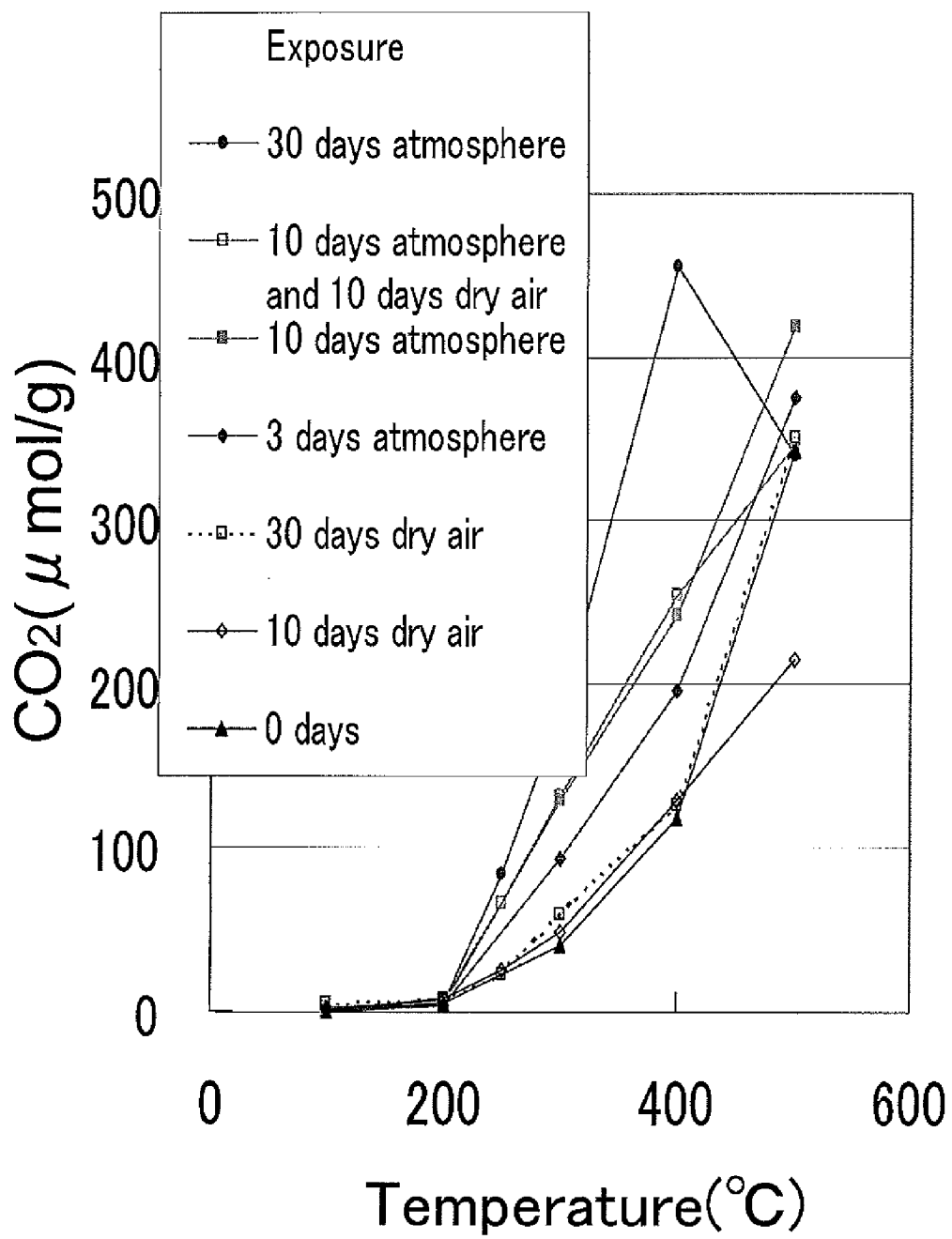
FIG. 6 is a graph showing the results of the thermal decomposition by gas chromatography of a positive electrode mixture layer contained in a complete positive electrode (lithium nickel composite oxide positive electrode)

Comparison between FIG. 2 and FIG. 6 clearly shows that in the cases of the same exposure conditions, the positive electrode mixture layer experiences a more drastic increase in the generation amount of the carbon dioxide gas than the lithium nickel composite oxide alone.

A possible cause of this is that in the step of completing the positive electrode by mixing the positive electrode active material, binding agent, and solvent together, the lithium (or lithium ions) in the lithium nickel composite oxide reacts with moisture and carbon dioxide gas in dry air to cause a larger amount of thermally decomposing carbonate compound to be generated. However, this cause alone cannot explain the drastic increase in the carbon dioxide gas amount. Hence, the drastic increase in the carbon dioxide gas amount possibly results from polyvinylidene fluoride serving as the binding agent.

That is, the polyvinylidene fluoride has fluorine in its molecule and therefore generates lithium hydrogen carbonate when thermally decomposed. The lithium carbonate alone is not decomposed into carbon dioxide gas even if heated to 500° C., whereas the positive electrode mixture layer contains polyvinylidene fluoride and generates hydrogen fluoride when heated. This hydrogen fluoride decomposes not only the thermally decomposing carbonate compound ($LiHCO_3$) remaining in the lithium nickel composite oxide but also the lithium carbonate ($Li_2CO_3$). This possibly increases the generation amount of the carbon dioxide gas drastically.

Referring to the generation amounts of the carbon dioxide gas at 400° C. and 500° C. shown in FIG. 6 while focusing on the difference in the generation amount of the carbon dioxide gas between the positive electrode mixture layers of different exposure conditions, heating to temperatures beyond 400° C. does not increase the difference. A possible reason why there is no increase in the difference is that because of the effect of the hydrogen fluoride, the carbon dioxide gas derived from the thermally decomposing carbonate compound is exhausted due to the heating to 400° C.

Experiment 8

In experiment 8, in view of the results on experiment 7, a study was further conducted on the influence of the polyvinylidene fluoride on the generation of the carbon dioxide gas using, as the positive electrode active material, lithium cobalt composite oxide, which is difficult to thermally decompose and generates substantially no carbon dioxide gas, lithium carbonate, and lithium nickel composite oxide that was not at all exposed to atmosphere.

<Preparation of Positive Electrode a>

Lithium carbonate and cobalt oxide were mixed together and baked at 700° C., thus obtaining lithium cobalt composite oxide ($LiCoO_2$).

Ninety five mass parts of the lithium cobalt composite oxide, 2.5 mass parts of carbon powder as a conducting agent, 2.5 mass parts of polyvinylidene fluoride (PVdF) as a binding agent, and N-methyl-2-pyrrolidone (NMP) were mixed together, thus preparing a positive electrode active material slurry. This positive electrode active material slurry was applied to both surfaces of a positive electrode current collector made of aluminum and dried. Then, the resulting product was rolled with a compressive roller, thus preparing a positive electrode a. The preparing steps were carried out in an atmosphere of 43% relative humidity and 25° C. temperature.

<Preparation of Positive Electrode b>

Ninety mass parts of the lithium carbonate, 10 mass parts of polyvinylidene fluoride (PVdF) as a binding agent, and N-methyl-2-pyrrolidone (NMP) were mixed together, thus preparing a slurry. This slurry was applied to both surfaces of a positive electrode current collector made of aluminum and dried. Then, the resulting product was rolled with a compressive roller, thus preparing a positive electrode b. The preparing steps were carried out in an atmosphere of 43% relative humidity and 25° C. temperature. It should be noted that the lithium carbonate does not function as an active material.

<Preparation of Positive Electrode c>

A positive electrode c was prepared in the same manner as in experimental example 1 except that the steps of preparing a positive electrode active material slurry containing lithium nickel composite oxide containing aluminum, applying the slurry, drying the slurry, and rolling this product were carried out in a dry air atmosphere having a dew point of −40° C. or lower. The positive electrode c was prepared in an ideal environment (in the most preferable atmosphere), and the electrode of experimental example 1 was prepared in a slightly inferior environment in that the step of preparing the slurry and the step of rolling the slurry were carried out in a dry air atmosphere, and the applying step of the slurry and the drying step of the slurry were carried out in an atmosphere of 43% humidity.

Figure 7:
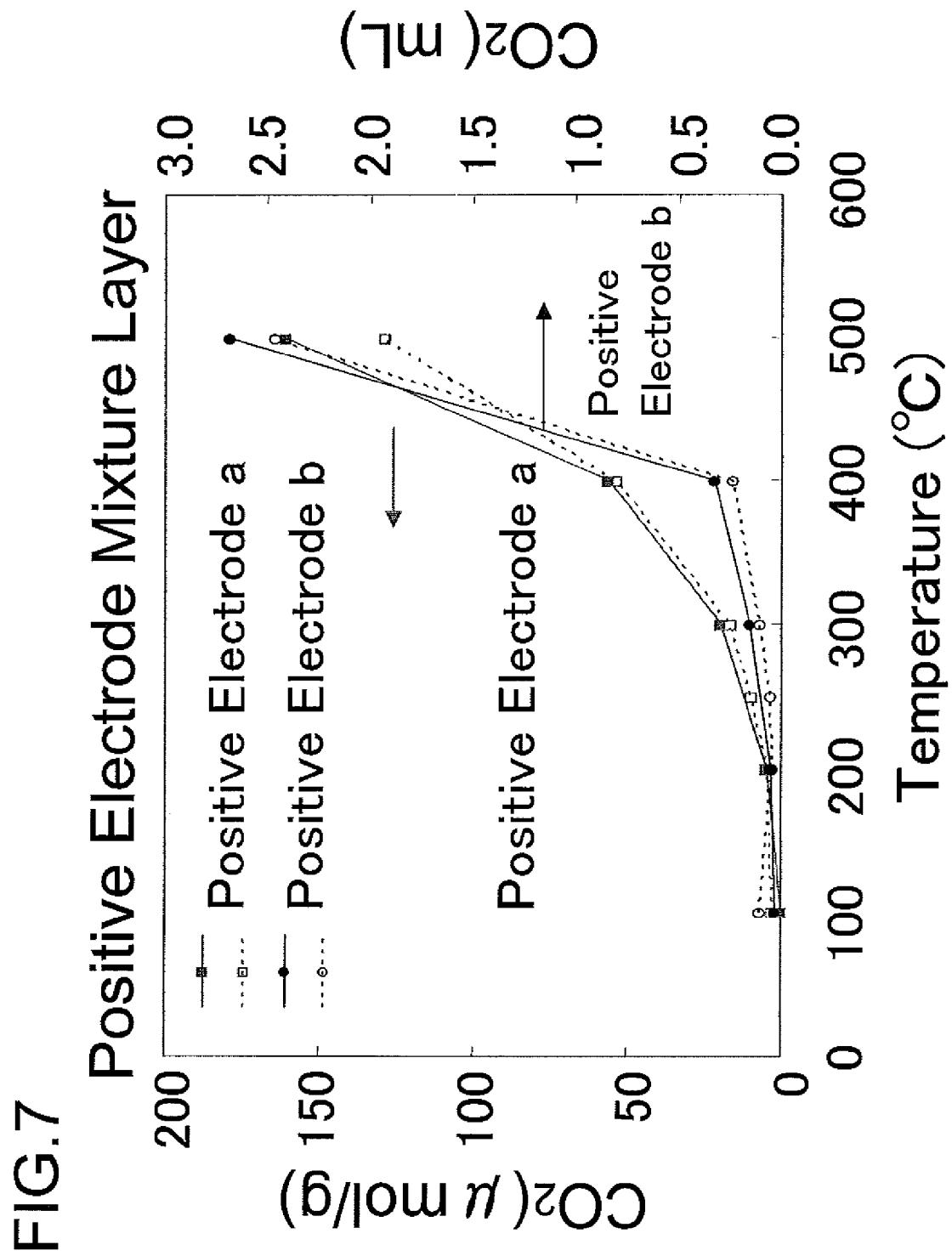
FIG. 7 is a graph showing the results of the thermal decomposition by gas chromatography of a positive electrode mixture layer contained in a positive electrode that uses lithium cobalt composite oxide as the positive electrode active material.

Positive electrode mixture layers were stripped off positive electrodes a and b, and the generation amount of carbon dioxide gas was measured by the thermal decomposition-gas chromatography method. The measurement was carried out to two samples of each of the examples. The results are shown in FIG. 7. The positive electrode mixture layer of positive electrode a was made of lithium cobalt composite oxide, a conducting agent, and a binding agent, while the positive electrode mixture layer of positive electrode b was made of lithium carbonate and a binding agent.

The positive electrode mixture layers were stripped off positive electrode a, which used a positive electrode mixture made of lithium cobalt composite oxide, a conducting agent, and a binding agent, positive electrode c, which used a positive electrode mixture made of lithium nickel composite oxide containing aluminum, a conducting agent, and a binding agent, and the positive electrode according to experimental example 1, which differed from positive electrode c only in production conditions. For these positive electrode mixture layers, the generation amount of carbon dioxide gas was measured by the thermal decomposition-gas chromatography method. The results are shown in FIGS. 7 and 8.

FIG. 7 clearly shows that carbon dioxide gas is generated from heating to 300° C. or higher in the cases of positive electrode a, which used as the positive electrode active material a lithium cobalt composite oxide containing no thermally decomposing carbonate compound or, if any, a minute amount of thermally decomposing carbonate compound, and positive electrode b, which used lithium carbonate and contained no conducting agent.

Figure 8:
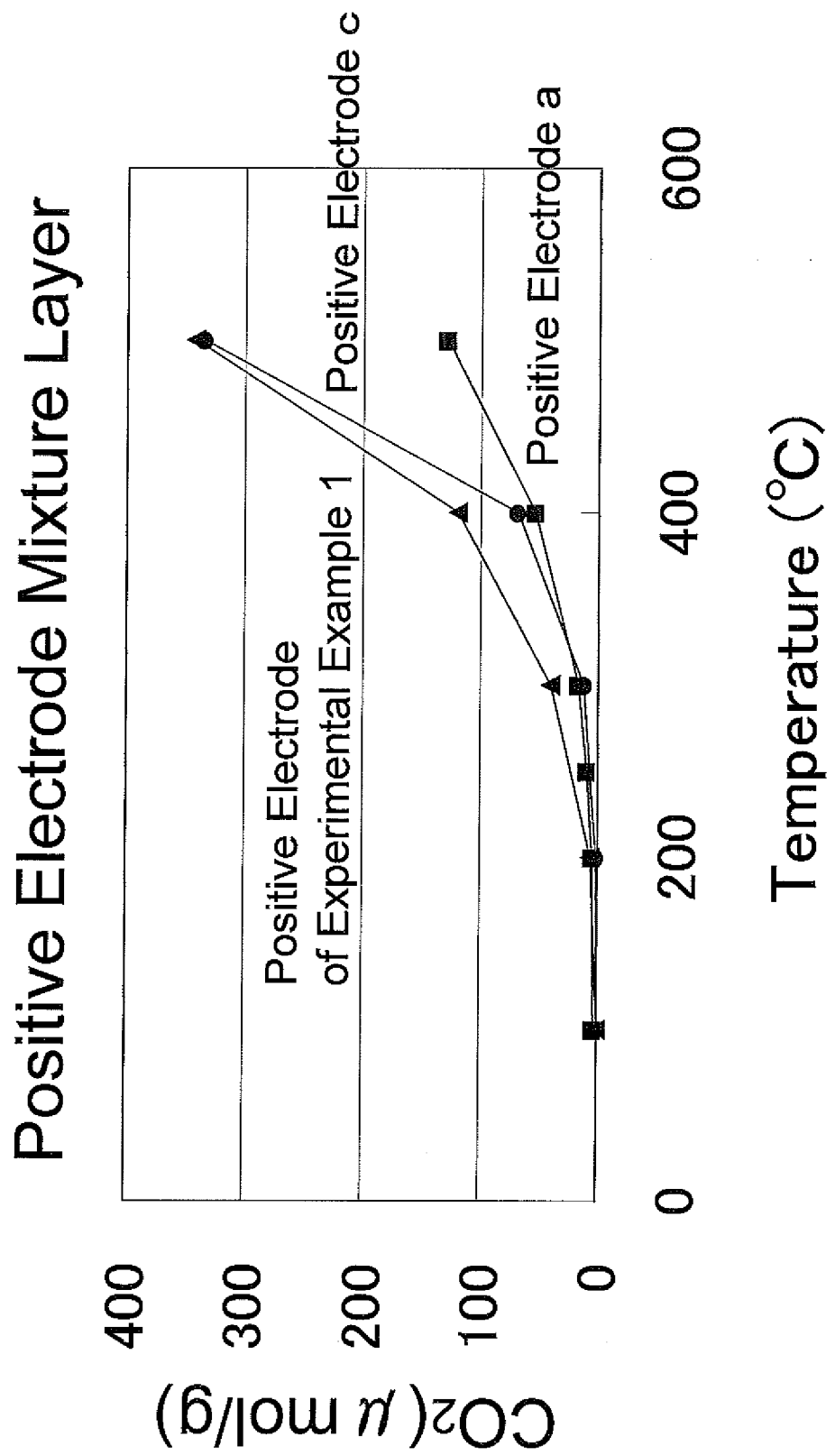
FIG. 8 is a graph showing the results of the thermal decomposition by gas chromatography of a positive electrode mixture layer contained in a positive electrode of different exposure conditions.

FIG. 8 shows that carbon dioxide gas is generated from heating to 300° C. or higher in the case of positive electrode c, which contained no thermally decomposing carbonate compound or, if any, a minute amount of thermally decomposing carbonate compound and was prepared in a dry air atmosphere.

The figures also show that in all the cases of positive electrodes a to c, the higher the heating temperature becomes, the larger the generation amount of carbon dioxide gas tends to be. FIG. 8 also shows that in the temperature range of 200° C. or higher and in the temperature range of 400° C. or lower, the generation amount of carbon dioxide gas is larger in the positive electrode according to experimental example 1 than in positive electrodes a and c.

These results lead to the conclusion that the conducting agent (carbon powder) is not the cause of the carbon dioxide gas, and much of the carbon dioxide gas that was generated in positive electrodes a to c is attributable to the existence of polyvinylidene fluoride.

The cause of the carbon dioxide gas in each of the positive electrodes can be analyzed in the following manner. First, description will be made of lithium carbonate. The lithium carbonate alone does not generate carbon dioxide gas even if heated to 500° C., as shown in FIG. 1. Hence, the generation of the carbon dioxide gas in positive electrode b, which is mainly made of lithium carbonate, is because hydrogen fluoride generated from the polyvinylidene fluoride promoted the thermal decomposition reaction of the lithium carbonate.

Next, description will be made of positive electrode a, which uses lithium cobalt composite oxide as the positive electrode active material. The lithium cobalt composite oxide is synthesized using lithium carbonate as a lithium source, and the lithium carbonate does not react with moisture existent in the environment atmosphere. The lithium cobalt composite oxide is less susceptible to moisture existent in the environment atmosphere than the lithium nickel composite oxide. The lithium nickel composite oxide itself is not decomposed at temperatures between 200 and 500° C. Thus, the carbon dioxide gas in positive electrode a is caused by remaining lithium carbonate that experiences no reaction in the course of synthesis. That is, the carbon dioxide gas is a result of thermal decomposition of the remaining lithium carbonate influenced by the hydrogen fluoride derived from the polyvinylidene fluoride.

Description will be made of positive electrode c. The difference in the generation pattern of carbon dioxide gas between the positive electrode according to experimental example 1 and positive electrode c is that in the case of the former, the slurry applying step and the slurry drying step were carried out in an atmosphere of 43% humidity, while in the case of the latter, even these steps were carried out in an ideal atmosphere with moisture shut out. This difference between the positive electrodes is clearly observed during heating to 200 to 400° C. However, the difference is no longer observed when the heating reaches 500° C. Hence, in order to detect the difference, the heating temperature condition needs to be 200° C. or higher and 400° C. or lower.

Further, from FIG. 8, which shows that positive electrode c prepared in an ideal atmosphere and positive electrode a using lithium cobalt composite oxide, which is hardly influenced by moisture in atmosphere, have substantially the same generation amounts and generation patterns of carbon dioxide gas at 400° C. or lower, and from FIG. 2, which shows that the generation amount of carbon dioxide gas is extremely small in the cases of "-□-" (0 hours of dry air exposure) and "-○-" (3 hours of atmosphere exposure), it can be said that the generation of carbon dioxide gas in the positive electrode according to experimental example 1 and positive electrode c is due to the influence of the hydrogen fluoride derived from the polyvinylidene fluoride.

Thus, it can be seen that by estimating as a control the generation amount of the carbon dioxide gas in the case of heating to 200 to 400° C. the lithium cobalt composite oxide positive electrode (positive electrode a), in which the amounts of the components other than the positive electrode active material are the same, the generation amount of the carbon dioxide gas in the case of heating to 200 to 400° C. the positive electrode mixture layer of the lithium nickel composite oxide positive electrode can be used as an indicator for judging the quality of the lithium nickel composite oxide positive electrode. This will be further studied by referring to FIG. 9.

In the experimental result of the thermal decomposition of the lithium nickel composite oxide positive electrode active material shown in FIG. 3, the generation amount of the carbon dioxide gas in the case of heating to 500° C. is approximately twice the generation amount in the case of heating to 300° C. In view of this, the generation amounts of the carbon dioxide gas in the case of 500° C. for the lithium nickel composite oxide were picked from FIG. 2, and corresponding generation amounts of the carbon dioxide gas in the case of 300° C. for the positive electrode mixture layer were picked from FIG. 6. Doubled values of the generation amounts of the carbon dioxide gas in the case of 300° C. for the positive electrode mixture layer and the generation amounts of the carbon dioxide gas in the case of 500° C. for the lithium nickel composite oxide are shown in corresponding pairs in FIG. 9. The same was carried out to the cases of positive electrodes a and c, the results of which are also shown in FIG. 9.

Figure 9:
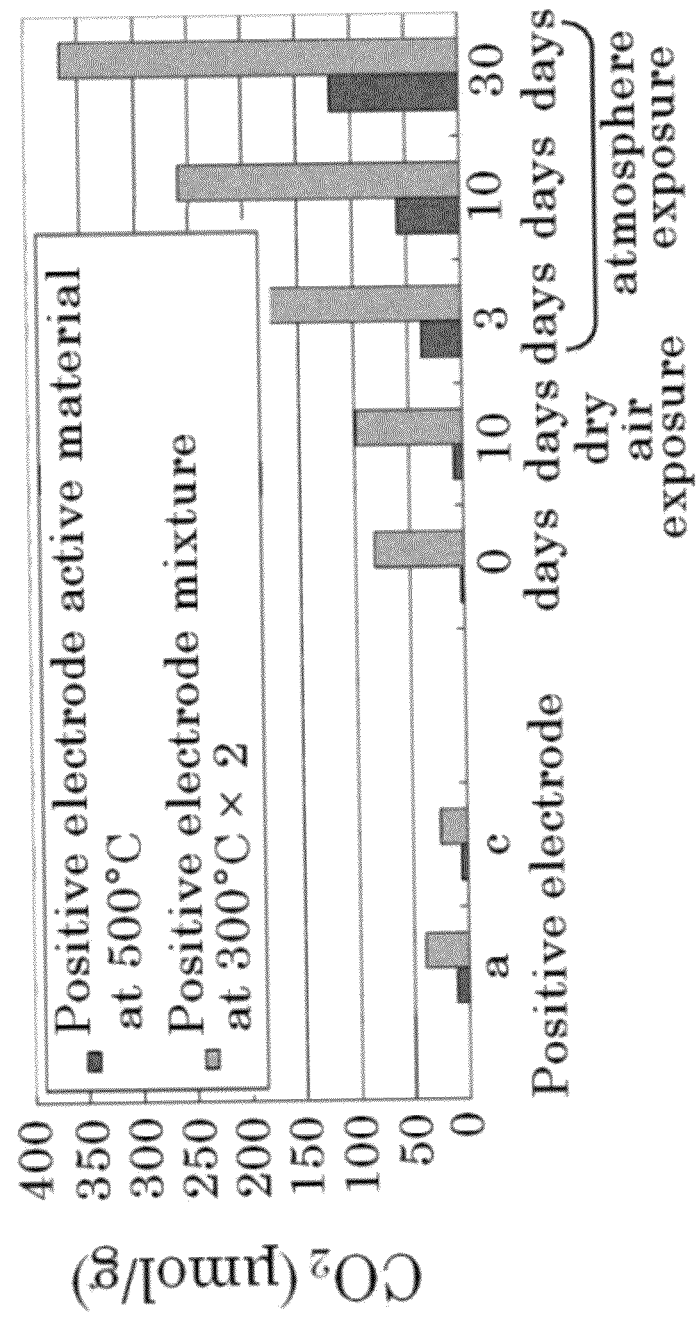
FIG. 9 is a graph that compares a carbon dioxide gas generation amount in the case of heating the positive electrode active material with a carbon dioxide gas generation amount in the case of heating the positive electrode mixture layer contained in the complete cell.

FIG. 9 shows that the relation between the exposure conditions and the doubled values of the generation amounts of the carbon dioxide gas generated from heating the positive electrode mixture layer to 300° C. shows substantially the same tendency as the relation between the exposure conditions and the generation amounts of the carbon dioxide gas generated from heating the positive electrode to 500° C. Hence, the amount of the thermally decomposing carbonate compound in the positive electrode mixture layer (the compound is decomposed when preserved at high temperature to generate carbon dioxide gas, ending up as a causing substance of the increase in the amount of cell swelling and decrease in the conductivity of the positive electrode) can be predicted using the generation amount of the carbon dioxide gas in the case of heating to 200° C. or higher and 400° C. or lower.

Figure 10:
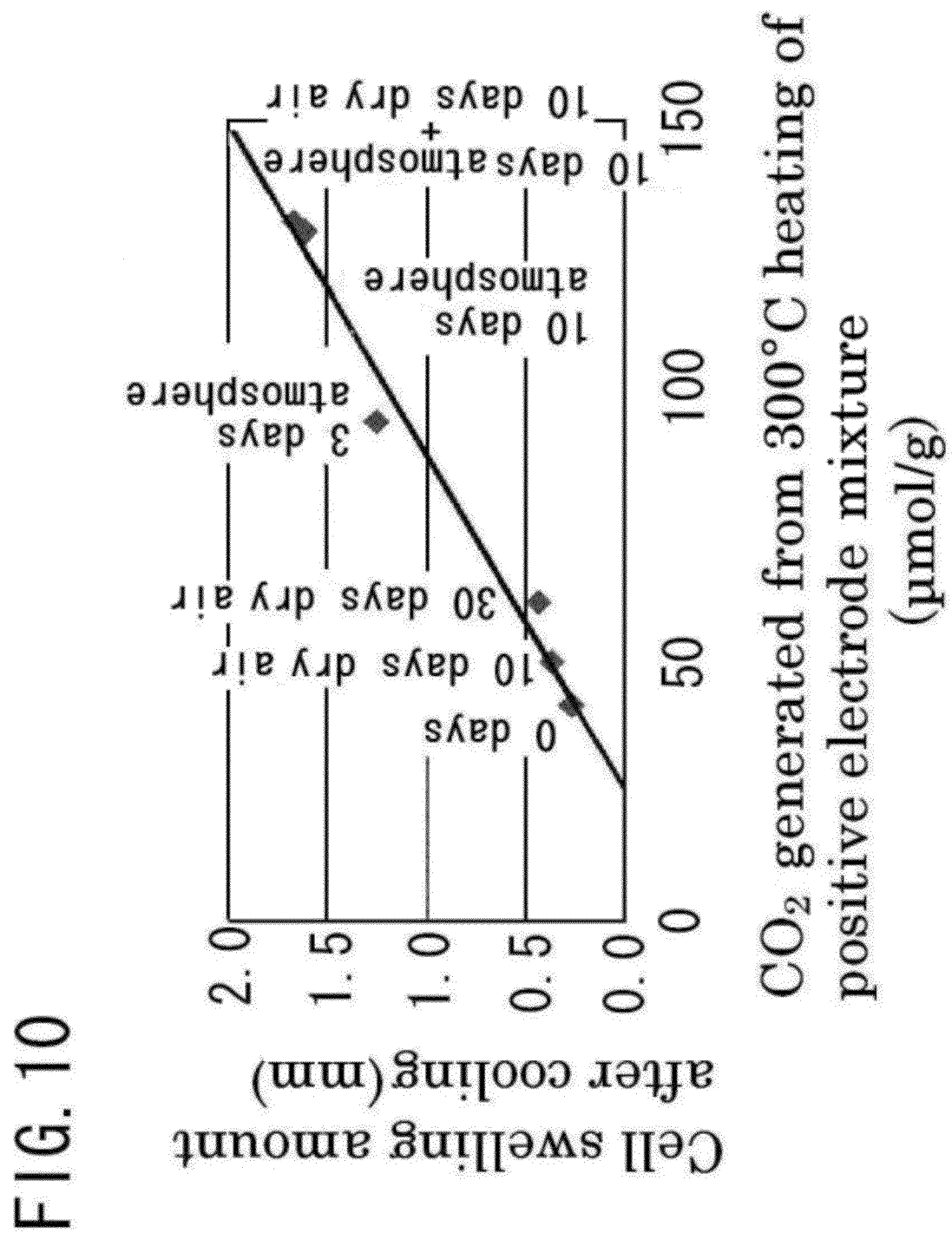
FIG. 10 is a graph showing a relation between the amount of cell swelling and the amount of the carbon dioxide gas that is generated from heating the positive electrode mixture layer contained in the complete cell to 300° C.

FIG. 10 shows a relation between the generation amount of the carbon dioxide gas in the case of heating the positive electrode mixture layer to 300° C. (see FIG. 6) and the amount of cell swelling. FIG. 10 clearly shows that there is a linear-functional relation between the generation amount of the carbon dioxide gas in the case of the 300° C. heating and the amount of cell swelling. Hence, by using the generation amount of the carbon dioxide gas in the case of heating the positive electrode mixture layer to 300° C. as an indicator, whether the quality of the positive electrode is good or bad can be judged. It should be noted that the amount of cell swelling is a value measured after the cell is left to cool to room temperature (25° C.).

Table 4 shows a list of the generation amounts (per 1 g of the positive electrode active material) of the carbon dioxide gas in the case of heating the positive electrode mixture layer to 300° C. and the results of experimental example 1.

TABLE 4

| | Exposure conditions | Amount of cell swelling (mm) | | Charge capacity (%) | Discharge capacity (%) | Initial efficiency (%) | Discharge load property (%) | *Generation amount of carbon dioxide gas (μ mole/g) |
|---|---|---|---|---|---|---|---|---|
| | | Immediately after picking out | After cooling | | | | | |
| Experimental Example 1 | None | 0.73 | 0.26 | 100.0 | 100.0 | 88.8 | 106.7 | 43 |
| Experimental Example 2 | Dry air: 10 days | 0.92 | 0.36 | 99.6 | 100.1 | 89.1 | 106.6 | 52 |
| Experimental Example 3 | Dry air: 30 days | 1.17 | 0.43 | 100.2 | 99.7 | 88.5 | 107.0 | 63 |
| Experimental Example 4 | Atmosphere: 3 Hrs | 1.12 | 0.46 | 100.5 | 100.4 | 88.9 | 106.9 | — |
| Experimental Example 5 | Atmosphere: 1 day | 1.89 | 0.69 | 100.2 | 98.8 | 88.4 | 107.8 | — |
| Experimental Example 6 | Atmosphere: 3 days | 3.97 | 1.25 | 99.0 | 96.9 | 88.1 | 108.2 | 99 |
| Experimental Example 7 | Atmosphere: 10 days | 4.43 | 1.61 | 96.0 | 90.0 | 85.9 | 110.2 | 135 |

TABLE 4-continued

| | Exposure conditions | Amount of cell swelling (mm) | | Charge capacity (%) | Discharge capacity (%) | Initial efficiency (%) | Discharge load property (%) | *Generation amount of carbon dioxide gas ($\mu$ mole/g) |
|---|---|---|---|---|---|---|---|---|
| | | Immediately after picking out | After cooling | | | | | |
| Experimental Example 8 | Atmosphere: 10 days Dry air: 10 days | 4.89 | 1.67 | 95.9 | 89.2 | 85.5 | 110.5 | 138 |

*The case of heating positive electrode mixture layer to 300° C.
—: Not measured.

Table 4 shows that when experimental examples 7 and 8 are assumed to be defective products while experimental examples 1 to 6 are assumed to be good products, then the 135 μmole/g carbon dioxide gas can be assumed as a reference such that a product is judged as a defective product when the generation amount of the carbon dioxide gas is equal to more than the reference or as a good product when the generation amount is less than the reference.

In view of this, the judgment reference is generalized on the basis of FIG. 6. The case of satisfying formulas 3 and 4 is judged as a good product (suitable product), while the case of not satisfying formulas 3 and 4 is judged as a defective product (unsuitable product).

$$y<(1.31x-258)/1000000 (200 \leq x<300) \quad \text{formula 3}$$

$$y<1.20x-225/1000000 (300 \leq x \leq 400) \quad \text{formula 4}$$

where x is the heating temperature (° C.) and y is the generation amount of carbon dioxide gas (mole/g) per 1 g of the positive electrode active material.

Experiment 9

In experiment 9, a study was conducted on the heating atmosphere conditions. A lithium nickel composite oxide was prepared in the same manner as in experimental example 1. Then, a positive electrode mixture was prepared using this lithium nickel composite oxide and applied onto a core material of the positive electrode mixture, and then dried. This product was then rolled, thus preparing a complete positive electrode. Then, the lithium nickel composite oxide and the positive electrode mixture removed out of the complete positive electrode were put into argon gas-filled SUS (Stainless Used Steel) reaction tubes and dry air-filled SUS (Stainless Used Steel) reaction tubes. These SUS reaction tubes were heated to measure the amount of the resulting carbon dioxide gas.

Figure 11:
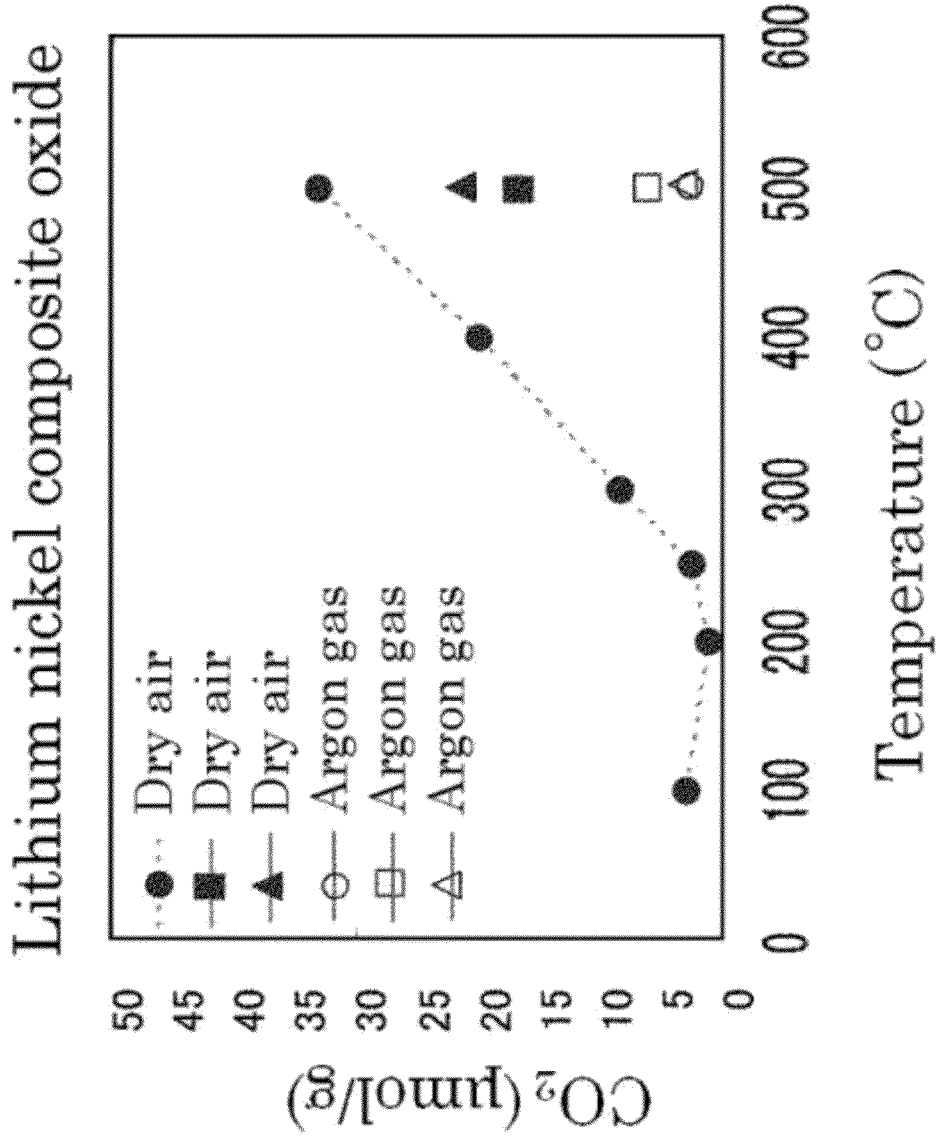
FIG. 11 is a graph showing a relation between the kind of the atmosphere during heating and the carbon dioxide gas generation amount in the lithium nickel composite oxide.
Figure 12:
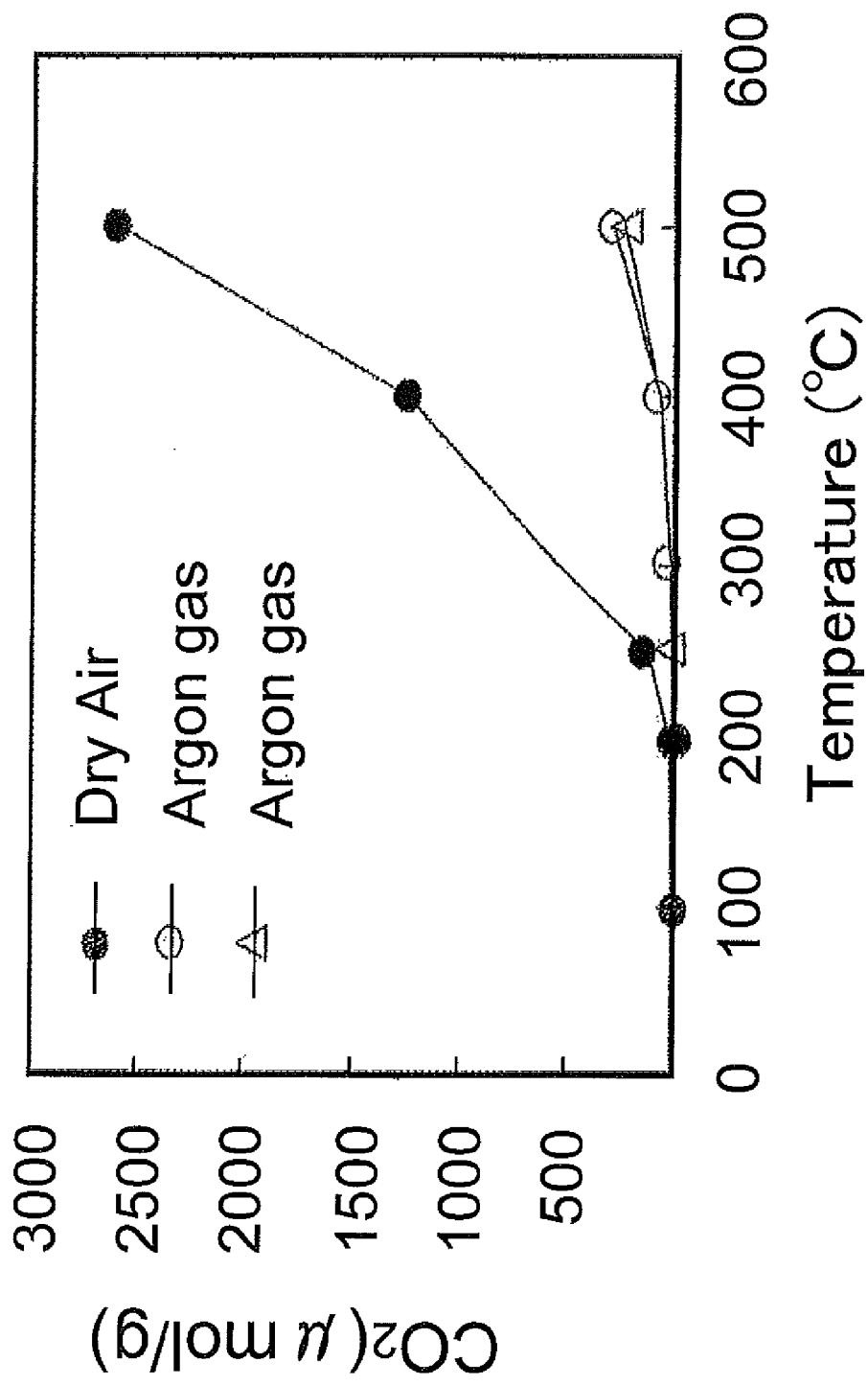
FIG. 12 is a graph showing a relation between the kind of the atmosphere during heating and the carbon dioxide gas generation amount in the positive electrode mixture layer.

The results are shown in FIGS. 11 and 12. The measurement for the lithium nickel composite oxide under the 500° C. heating temperature condition was carried out using three samples in the both cases of dry air and argon gas. In the case of the positive electrode mixture layer, the measurement was carried out using two samples only in the case of argon gas at the 500° C. heating temperature (○, Δ in FIG. 12).

FIG. 11 shows that in the conditions of 500° C. heating temperature and dry air, the three measurement values vary considerably (see ●, □, ▲). On the contrary, in the conditions of 500° C. heating temperature and argon gas, the values show a small variation (see ○, □, Δ). The generation amount of carbon dioxide gas is large in the dry air condition and small in the argon gas condition. FIG. 12 also shows this tendency in the case of the positive electrode mixture layer.

FIGS. 11 and 12 show that the generation amount of carbon dioxide gas in the dry air atmosphere is much larger than in the argon atmosphere both in the case of the lithium nickel composite oxide and the positive electrode mixture layer. The largest difference between the dry air atmosphere and the argon gas atmosphere is the presence or absence of active gas. In the measurement in the argon gas atmosphere, where no active gas such as oxygen exists, there is a small variation between measurement values and the increase in the generation amount of carbon dioxide gas is also small. On the contrary, the dry air atmosphere contains oxygen derived from atmosphere. Hence, in heating in dry air atmosphere, an organic substance that remains in minute amounts in the lithium nickel composite oxide and the positive electrode mixture layer, which are measurement samples, and in the test tubes (SUS reaction tubes) possibly reacts with this oxygen (combusts) to generate carbon dioxide gas. This carbon dioxide gas possibly adds to the amount of the carbon dioxide gas that is derived from the thermally decomposing carbonate compound and that the present invention originally intends to measure, thereby causing the carbon dioxide gas amount to increase and the measurement values to vary.

From the results shown in FIGS. 11 and 12, it can be said that the organic substance that remains in minute amounts in the lithium nickel composite oxide and the positive electrode mixture layer and in the SUS (Stainless Used Steel) reaction tubes is large compared with the generation amount of the originally intended carbon dioxide gas to be measured by the present invention. Hence, the quality judgment method according to the present invention needs to thermally decompose the sample in an atmosphere using inactive gas (such as argon as and nitrogen gas). Argon gas is particularly preferable in that it is chemically inactive and non-reactive. Therefore, the thermal decomposition is preferably carried out in an argon gas atmosphere.

(Supplemental Remarks)

The lithium nickel composite oxide encompassed by the present invention is not limited to $LiNi_{0.8}Co_{0.15}Al_{0.05}O_2$. For example, the present invention encompasses $Li_aNi_xM_{1-x}O_2$ (where M is at least one selected from Co, Al, Zr, Ti, Mg, and Mn, $0.9 \leq a \leq 1.1$, and $0.5 \leq x \leq 1$).

INDUSTRIAL APPLICABILITY

As has been described hereinbefore, with the method for judging whether a positive electrode active material is good or bad according to the present invention, whether the quality of lithium nickel composite oxide used as the positive electrode active material is good or bad can be judged easily, while with the method for judging whether a positive electrode is good or bad according to the present invention, whether the quality of a positive electrode using the lithium nickel composite oxide is good or bad can be judged easily. Hence, by selecting and using only a suitable lithium nickel composite oxide product judged by the former method, a suitable positive electrode can be prepared, and by preparing a non-aqueous electrolyte secondary cell by selecting and using a positive electrode judged by the latter method, a non-aqueous electrolyte secondary cell having desired performance is produced with a good yield. Thus, the industrial applicability of the present invention is considerable.

What is claimed is:

1. A method for producing a positive electrode for a non-aqueous electrolyte secondary cell, the method comprising the steps of:

a baking step of baking a positive electrode active material precursor containing a lithium source and a nickel source in order to render the positive electrode active material precursor a lithium nickel composite oxide;

a measuring step of measuring the amount of carbon dioxide gas generated when the lithium nickel composite oxide is heated to 200° C. or higher and 1500° C. or lower in an inactive gas atmosphere;

a selecting step of selecting a lithium nickel composite oxide satisfying the following formulas:

$$y<(0.27x-51)/1000000 (200 \leq x < 400) \quad \text{formula 1}$$

$$y<57/1000000 (400 \leq x \leq 1500) \quad \text{formula 2}$$

where x is a heating temperature (° C.) in the measuring step and y is the amount of carbon dioxide gas (mole/g) per 1 g of the lithium nickel composite oxide measured in the measuring step; and a positive electrode completing step of completing the positive electrode by using a positive electrode active material mainly made of the lithium nickel composite oxide selected in the selecting step.

2. The method for producing a positive electrode for a non-aqueous electrolyte secondary cell according to claim 1, wherein the heating temperature in the measuring step is 400° C. or higher and 500° C. or lower.

3. The method for producing a positive electrode for a non-aqueous electrolyte secondary cell according to claim 1, wherein the measurement of the amount of carbon dioxide gas is carried out by gas chromatography.

4. The method for producing a positive electrode for a non-aqueous electrolyte secondary cell according to claim 1, wherein argon gas is used as the inactive gas.

5. The method for producing a positive electrode for a non-aqueous electrolyte secondary cell according to claim 1, wherein the mass percentage of the lithium nickel composite oxide in the positive electrode active material mainly made of the lithium nickel composite oxide is 50 to 100 mass %.

\* \* \* \* \*